(12) United States Patent
Toriumi et al.

(10) Patent No.: US 11,265,477 B2
(45) Date of Patent: Mar. 1, 2022

(54) IMAGE CAPTURING APPARATUS AND NON-TRANSITORY RECORDING MEDIUM

(71) Applicant: CANON KABUSHIKI KAISHA, Tokyo (JP)

(72) Inventors: Yusuke Toriumi, Tokyo (JP); Kikuo Kazama, Kawasaki (JP); Nobuhiko Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/893,662

(22) Filed: Jun. 5, 2020

(65) Prior Publication Data
US 2020/0304718 A1 Sep. 24, 2020

Related U.S. Application Data

(63) Continuation of application No. 16/369,015, filed on Mar. 29, 2019, now Pat. No. 10,715,736.

(30) Foreign Application Priority Data

Apr. 3, 2018 (JP) .............................. JP2018-071918

(51) Int. Cl.
*H04N 5/232* (2006.01)
*G06F 3/16* (2006.01)
(Continued)

(52) U.S. Cl.
CPC ......... *H04N 5/23299* (2018.08); *G06F 3/167* (2013.01); *G10L 15/22* (2013.01);
(Continued)

(58) Field of Classification Search
CPC ............. H04N 1/00403; H04N 5/2251; H04N 5/2252; H04N 5/232; H04N 5/23203;
(Continued)

(56) References Cited

U.S. PATENT DOCUMENTS 5,959,667 A * 9/1999 Maeng ................ H04N 7/15
348/211.99
6,005,610 A * 12/1999 Pingali ................ G01S 3/808
348/14.16
(Continued)

FOREIGN PATENT DOCUMENTS

CN 103051838 A 4/2013
CN 104092936 A 10/2014
(Continued)

OTHER PUBLICATIONS

The above documents were cited in a Nov. 18, 2020 Chinese Office Action, which is enclosed with an English Translation, that issued in Chinese Patent Application No. 201910266230.5.

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

An image capturing apparatus including an image capturing unit capable of moving its imaging direction and a sound input unit including a plurality of microphones, a sound source direction detecting unit which detects a sound source direction based on sound data from the sound input unit, a control unit which performs processing related to image capturing, and, a vibration detecting unit which detects a vibration due to a contact on a housing of the image capturing apparatus, wherein, in a case where a vibration due to a contact is detected, the sound source direction detecting unit detects a direction of sound due to the contact, (Continued)

the control unit estimates a position of the contact on the housing, and the control unit sets the imaging direction of the image capturing unit to a direction based on the estimated position.

7 Claims, 22 Drawing Sheets

(51) Int. Cl.
    *H04R 1/02*     (2006.01)
    *H04R 1/40*     (2006.01)
    *G10L 15/22*     (2006.01)
    *H04R 3/00*     (2006.01)
    *H04N 1/00*     (2006.01)
    *H04N 5/225*     (2006.01)
    *H04N 101/00*     (2006.01)

(52) U.S. Cl.
    CPC ......... *H04N 1/00403* (2013.01); *H04N 5/232* (2013.01); *H04N 5/23203* (2013.01); *H04R 1/028* (2013.01); *H04R 1/406* (2013.01); *H04R 3/005* (2013.01); *H04N 5/2252* (2013.01); *H04N 2101/00* (2013.01)

(58) Field of Classification Search
    CPC ........... H04N 5/23222; H04N 5/23241; H04N 5/23258; H04N 5/2328; H04N 5/23299; H04N 2101/00; H04R 1/028; H04R 1/406; H04R 3/005; H04R 2430/23; G06F 3/167; G10K 11/18; G10L 15/22; G10L 15/26

See application file for complete search history.

(56) References Cited

U.S. PATENT DOCUMENTS

| | | | |
|---|---|---|---|
| 6,593,956 | B1 | 7/2003 | Potts et al. |
| 8,044,990 | B2 * | 10/2011 | Kawaguchi ............... H04N 7/15 348/14.09 |
| 2002/0140804 | A1 | 10/2002 | Colmenarez et al. |
| 2004/0263636 | A1 | 12/2004 | Cutler et al. |
| 2005/0118990 | A1 * | 6/2005 | Stephens ........... H04M 1/72439 455/418 |
| 2008/0100719 | A1 | 5/2008 | Huang |
| 2012/0083314 | A1 * | 4/2012 | Ng ....................... H04N 5/2252 455/557 |
| 2015/0296340 | A1 | 10/2015 | Crutchfield |
| 2016/0182800 | A1 | 6/2016 | Kaneko |
| 2016/0269613 | A1 | 9/2016 | Kallstrom et al. |
| 2016/0323504 | B2 * | 11/2016 | Ono .................... H04N 9/04515 |
| 2017/0070668 | A1 | 3/2017 | Bohac et al. |
| 2017/0220113 | A1 | 8/2017 | Iino |
| 2017/0243581 | A1 | 8/2017 | Mozer |

FOREIGN PATENT DOCUMENTS

| | | |
|---|---|---|
| CN | 104253944 A | 12/2014 |
| CN | 105529033 A | 4/2016 |
| CN | 105938657 A | 9/2016 |
| JP | 2016-536868 A | 11/2016 |
| WO | 2015/055655 A1 | 4/2015 |

* cited by examiner

FIG. 7

COMMANDS

| | |
|---|---|
| START | "Hi, Camera", "Wake-up, Camera" |
| STOP | "Good bye Camera", "ByeBye Camera" |
| SHOOT STILL IMAGE | "Snap me", "Take a picture" |
| START SHOOTING MOVING IMAGE | "Start movie", "Take a video" |
| END SHOOTING MOVING IMAGE | "Stop movie" |
| START TRACKING | "Follow me", "Track me" |
| END TRACKING | "Stop Following", "Stop tracking" |
| ⋮ | |
| START AUTOMATIC MOVING IMAGE SHOOTING | "Start Auto movie" |
| ⋮ | |
| ZOOM-IN COMMAND | "Zoom In" |
| ZOOM-OUT COMMAND | "Zoom Out" |

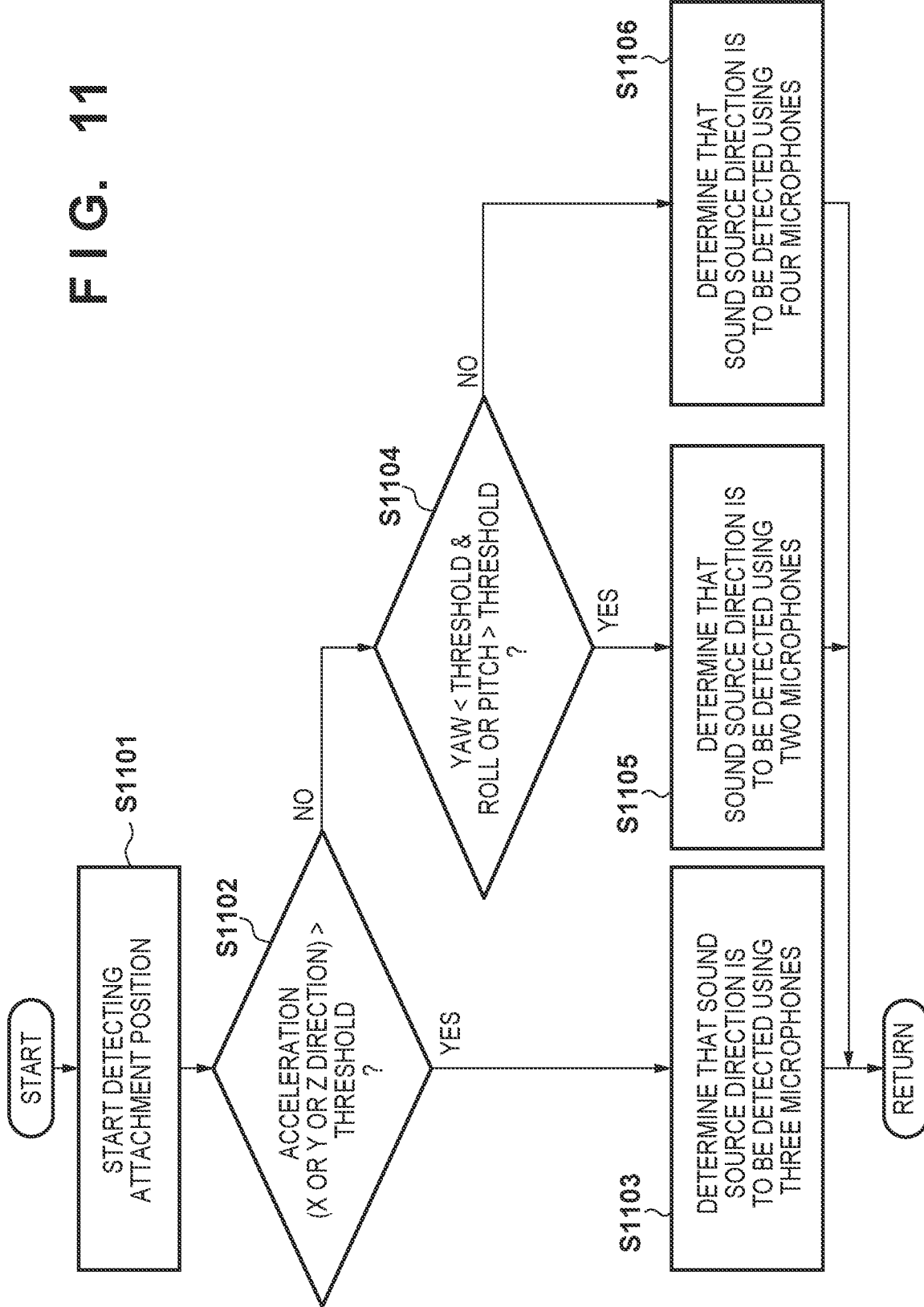

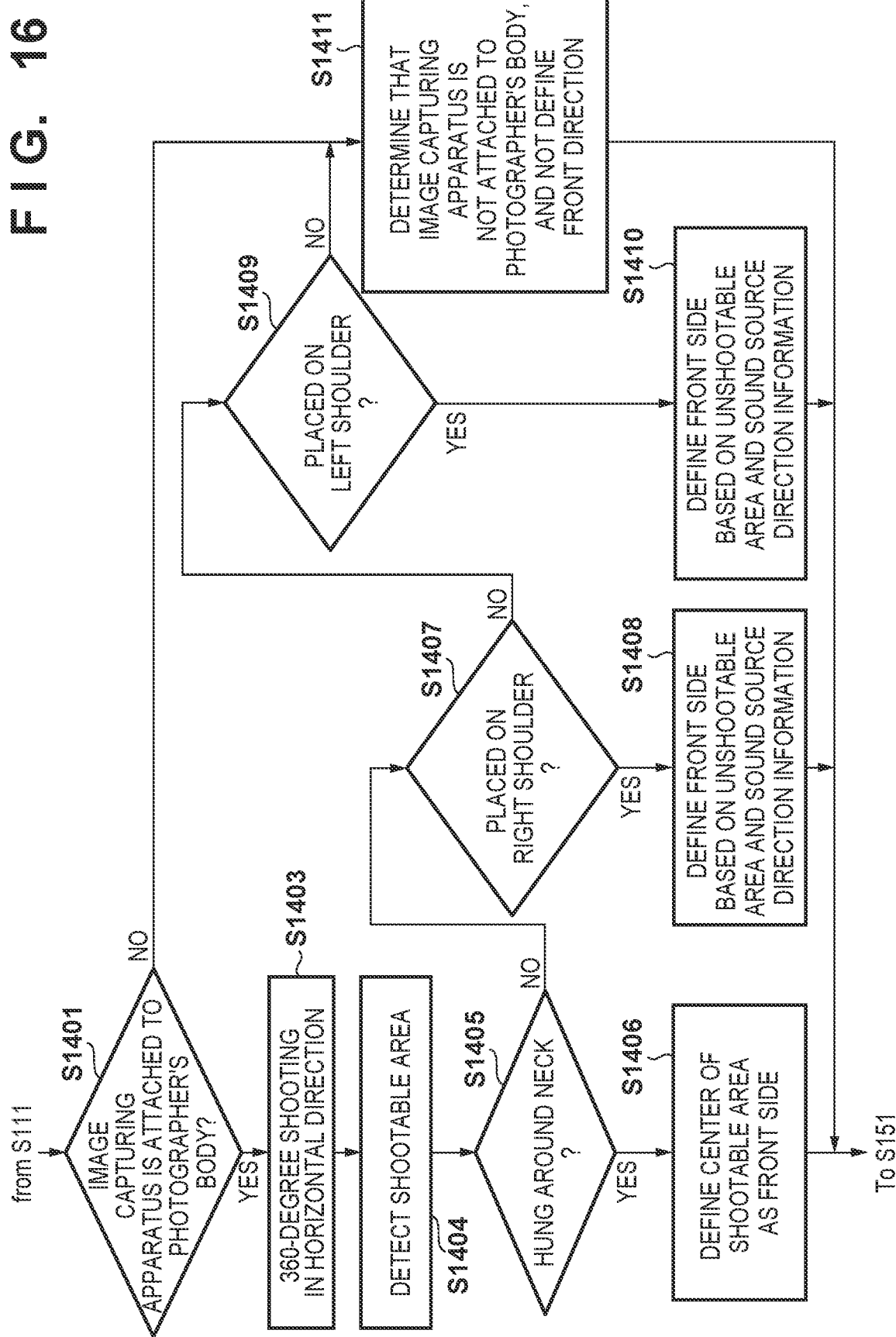

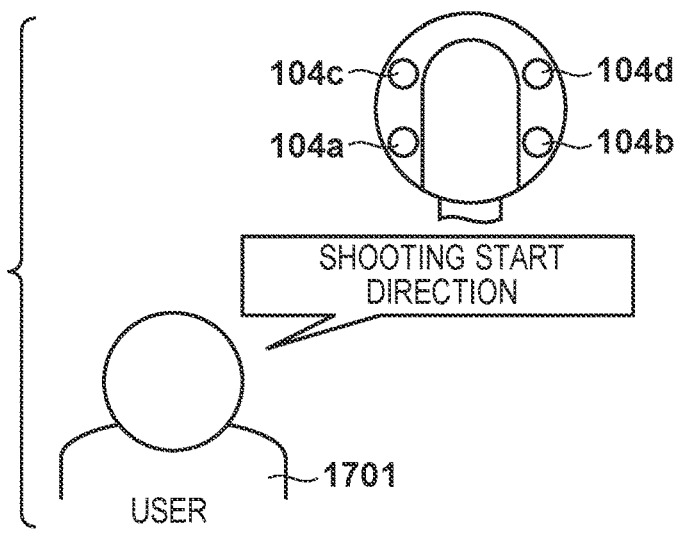
F I G. 19A
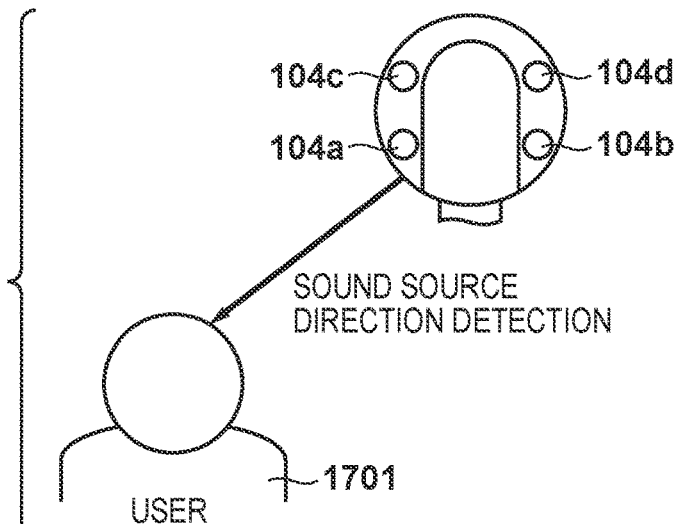
F I G. 19B
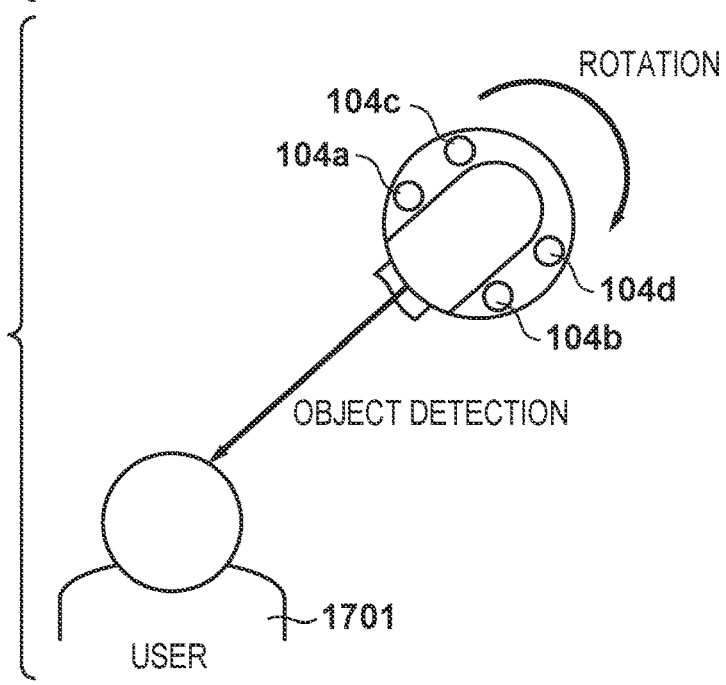
F I G. 19C

IMAGE CAPTURING APPARATUS AND NON-TRANSITORY RECORDING MEDIUM

CROSS-REFERENCE TO RELATED APPLICATION

This application is a continuation of application Ser. No. 16/369,015, filed Mar. 29, 2019, the entire disclosure of which is hereby incorporated by reference.

BACKGROUND OF THE INVENTION

Field of the Invention

The present invention relates to an image capturing apparatus and a non-transitory recording medium.

Description of the Related Art

When a still image or a moving image is shot by an image capturing apparatus such as a camera, usually, a user determines an object to be shot through a finder or the like, checks a shooting state on his own to adjust framing of an image to be shot, and then shoots the image. Such an image capturing apparatus is equipped with a function of detecting an operational error made by the user and notifying the user of the detected error, as well as detecting an external environment and notifying the user if the external environment is not appropriate for shooting. Also, there have conventionally been mechanisms for controlling a camera so as to achieve a state appropriate for shooting.

Meanwhile, there are lifelogging cameras for regularly and continuously performing shooting images without the user giving a shooting instruction. Japanese Patent Laid-Open No. 2016-536868 is an example thereof. A lifelogging camera is used in a state in which it is attached to a user's body with a strap or the like, and records scenes that the user sees in his daily life as a video at fixed time intervals. In the shooting using the lifelogging camera, the user does not shoot an image at an intended timing by releasing a shutter, for example, but shooting is performed at fixed time intervals, and thus, unintended moments that are not usually shot can be left as a video.

A search through sound source direction detection is known as a method of detecting an object to be shot by a lifelogging camera. An object that is present out of the angle of view can be detected by detecting a direction from which sound comes based on sound information that is input to a sound collection unit or the like provided in the lifelogging camera.

Also, camera control by means of sound recognition is known as a method of controlling the lifelogging camera. An instruction to start shooting, for example, can be controlled using voice of an operator without making any operation to a button or a UI, by associating a specific word with a specific control.

However, when a lifelogging camera is in a state in which it is attached to a user's body, problems often arises, e.g. even if an instruction to start shooting is given by voice, the positional relationship with the person to which the lifelogging camera is attached is incorrectly recognized depending on the attaching position, and shooting cannot be performed in an intended direction.

SUMMARY OF THE INVENTION

The present invention has been made in view of the foregoing problem, and aims to provide a technique capable of setting an image capturing apparatus so as to be oriented toward a desired direction for a user.

According to a first aspect of the invention, there is provided an image capturing apparatus comprising: an image capturing unit configured to move its image capturing direction; a sound input unit including a plurality of microphones; a sound source direction detecting unit configured to detect a sound source direction based on sound data input from the sound input unit; a control unit configured to perform processing related to image capturing; and a vibration detecting unit configured to detect a vibration due to a contact on a housing of the image capturing apparatus, wherein, in a case where a vibration due to a contact is detected by the vibration detecting unit, the sound source direction detecting unit detects a direction of sound due to the contact, wherein the control unit estimates a position of the contact on the housing, and wherein the control unit sets the image capturing direction of the image capturing unit to a direction based on the estimated position.

According to a second aspect of the invention, there is provided an image capturing apparatus comprising: an image capturing unit configured to move its image capturing direction, a recognition unit configured to recognize a sound command based on sound data input from a microphone; and a control unit configured to cause the image capturing unit to capture a video or an image in a predetermine direction in accordance with the recognized sound command, wherein, in a case where a preset sound command is recognized by the recognition unit, the control unit determines the predetermined direction based on a plurality of images captured while changing the image capturing direction of the image capturing unit.

According to a third aspect of the invention, there is provided an image capturing apparatus comprising: an image capturing unit configured to move its image capturing direction is variable, comprising: a sound input unit including a plurality of microphones; a recognition unit configured to recognize a sound command indicated by sound data input from the sound input unit; a sound source direction detecting unit configured to detect a sound source direction based on sound data input from the sound input unit; and a control unit configured to perform processing related to image capturing, wherein the control unit performs control to match the image capturing direction of the image capturing unit to the sound source direction detected by the sound source direction detecting unit, wherein, in a case where a first sound command is recognized by the recognition unit, the control unit determines a direction in which a person's face is oriented that is obtained by performing control to match the image capturing direction of the image capturing unit to the sound source direction detected by the sound source direction detecting unit, wherein the control unit stores the determined direction as a direction in which an image is to be captured when a second sound command is recognized, and in a case where the second sound command is recognized, the control unit performs control to match the image capturing direction of the image capturing unit to the stored direction and captures an image.

According to a fourth aspect of the invention, there is provided a non-transitory recording medium storing a program for causing an image capturing apparatus, which includes an image capturing unit whose image capturing direction is variable, and a sound input unit including a plurality of microphones, to perform a control method, the control method comprising: detecting a sound source direction based on sound data input from the sound input unit; performing processing related to image capturing; and detecting a vibration due to a contact on a housing of the image capturing apparatus, wherein, in a case where a vibration due to a contact is detected, a direction of sound due to the contact is detected, wherein a position of the contact on the housing is estimated, and wherein the image capturing direction of the image capturing unit is set to a direction based on the estimated position.

According to a fifth aspect of the invention, there is provided a non-transitory recording medium storing a program for causing an image capturing apparatus, which includes an image capturing unit whose image capturing direction is variable, to perform a control method, the control method comprising: recognizing a sound command based on sound data input from a microphone; and causing the image capturing unit to capture a video or an image in a predetermine direction in accordance with the recognized sound command, wherein, in a case where a preset sound command is recognized, the predetermined direction is determined based on a plurality of images captured while changing the image capturing direction of the image capturing unit.

According to a sixth aspect of the invention, there is provided a non-transitory recording medium storing a program for causing an image capturing apparatus, which includes an image capturing unit whose image capturing direction is variable, and a sound input unit including a plurality of microphones, to perform a control method, the control method comprising: recognizing a sound command indicated by sound data input from the sound input unit; detecting a sound source direction based on sound data input from the sound input unit; and performing processing related to image capturing, wherein the image capturing direction of the image capturing unit is controlled to match to the sound source direction detected in the detecting, wherein, in a case where a first sound command is recognized in the recognizing, a direction in which a person's face is oriented that is obtained by performing control to match the image capturing direction of the image capturing unit to the sound source direction detected in the detecting is determined, wherein the determined direction is stored as a direction in which an image is to be captured when a second sound command is recognized in the recognizing, and in a case where the second sound command is recognized in the recognizing, the image capturing direction of the image capturing unit is controlled to match to the stored direction and an image is captured.

According to the first aspect of the invention, by performing an operation to knock the image capturing apparatus, a user can orient the image capturing direction toward a direction corresponding to the knocking position, rather than using sound.

According to the second aspect of the invention, a direction to serve as a front direction for the user can be set by uttering the preset sound command to determine a position at which the image capturing apparatus is to be set up.

According to the third aspect of the invention, only by uttering the preset sound command and performing an operation to orient the face toward a desired direction, the direction in which an image is to be captured can be registered when the specific sound command is uttered.

Further features of the present invention will become apparent from the following description of exemplary embodiments with reference to the attached drawings.

BRIEF DESCRIPTION OF THE DRAWINGS

FIG. 7 shows a relationship between sound commands and meanings of the sound commands according to the embodiments.

FIG. 11 is a flowchart illustrating set-up position detection processing according to a first embodiment.

FIG. 16 is a flowchart illustrating front determination processing and set-up position determination processing according to a second embodiment.

FIGS. 19A to 19E illustrate shooting direction registration processing according to a third embodiment.

DESCRIPTION OF THE EMBODIMENTS

Hereinafter, the embodiments according to the present invention will be described in detail in accordance with the drawings.

First Embodiment

Figure 1:
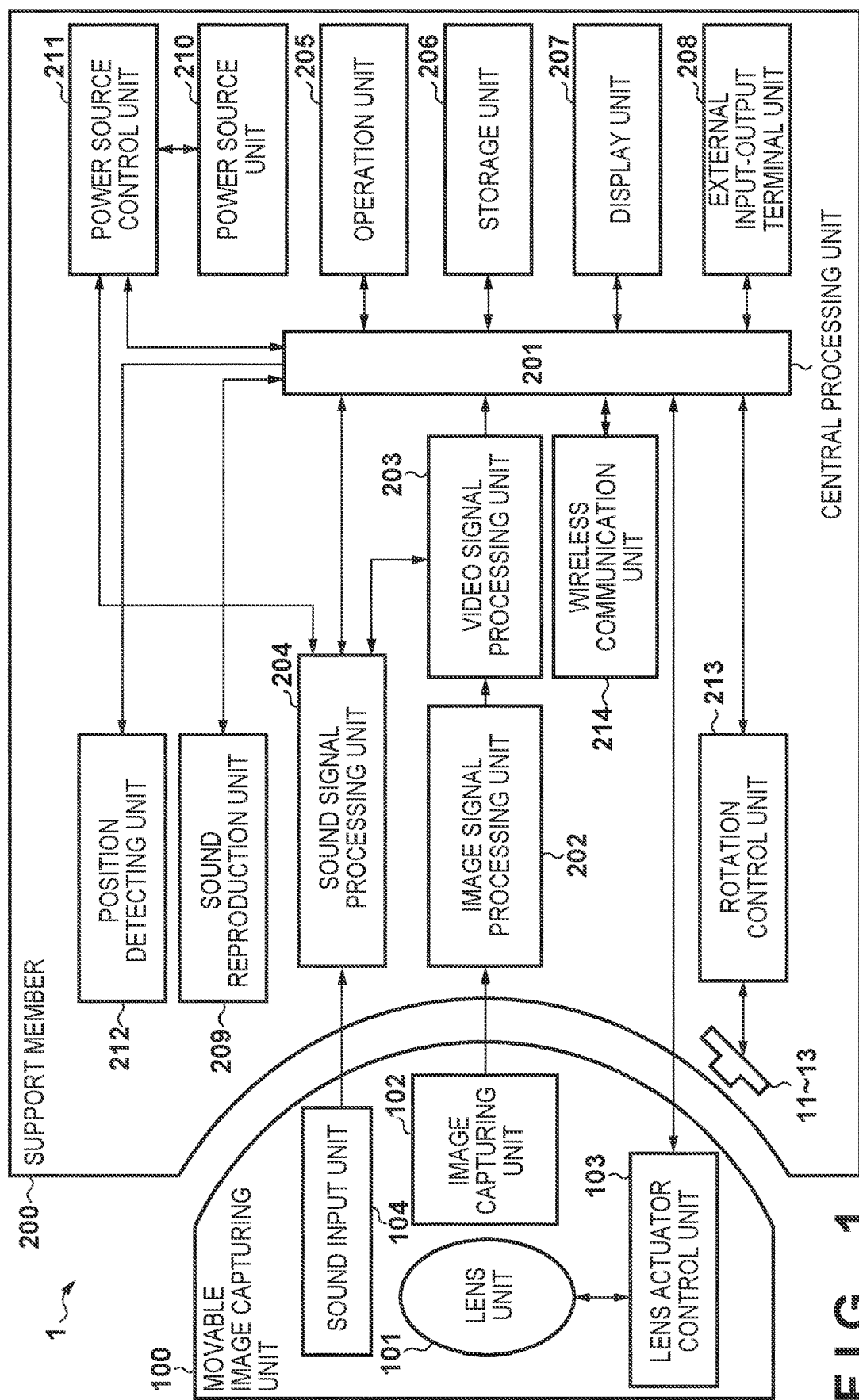
FIG. 1 is a block diagram of an image capturing apparatus according to embodiments.

FIG. 1 is a block configuration diagram of an image capturing apparatus 1 according to the first embodiment. The image capturing apparatus 1 includes an optical lens unit, and is constituted by a movable image capturing unit 100 whose image capturing direction (optical axis direction), in which an image is to be captured, is variable, as well as a support member 200 that includes a central processing unit (CPU) for controlling driving of the movable image capturing unit 100 and controlling the entire image capturing apparatus.

Note that the support member 200 is provided with a plurality of vibrators 11 to 13, which include piezoelectric elements, so as to be in contact with a face of the movable image capturing unit 100. The movable image capturing unit 100 performs panning and tilting operations by controlling vibration of these vibrators 11 to 13. Note that the panning and tilting operations may be realized by a servo motor or the like.

The movable image capturing unit 100 includes a lens unit 101, an image capturing unit 102, a lens actuator control unit 103, and a sound input unit 104.

The lens unit 101 is constituted by an imaging optical system, which includes a zoom lens, a diaphragm/shutter, a focus lens, and so on. The image capturing unit 102 includes an image sensor, such as a CMOS sensor or a CCD sensor, and photoelectrically converts an optical image formed by the lens unit 101 to output an electrical signal. The lens actuator control unit 103 includes a motor driver IC, and drives various actuators for the zoom lens, the diaphragm/shutter, the focus lens, and so on in the lens unit 101. Various actuators are driven based on actuator driving instruction data, which is received from a later-described central processing unit 201 in the support member 200. The sound input unit 104 is a sound input unit that includes microphones and is constituted by a plurality of (four in this embodiment) microphones, converts sound to an electrical signal, and further converts the electrical signal to a digital signal (sound data) to output the converted signal.

Meanwhile, the support member 200 includes the central processing unit 201 for controlling the entire image capturing apparatus 1. The central processing unit 201 is constituted by a CPU, a ROM that stores programs to be executed by the CPU, and a RAM that is used as a work area for the CPU. The support member 200 also includes an image signal processing unit 202, a video signal processing unit 203, a sound signal processing unit 204, an operation unit 205, a storage unit 206, and a display unit 207. Furthermore, the support member 200 includes an external input-output terminal unit 208, a sound reproduction unit 209, a power source unit 210, a power source control unit 211, a position detecting unit 212, a rotation control unit 213, a wireless communication unit 214, and the already-described vibrators 11 to 13.

The image signal processing unit 202 converts an electrical signal output from the image capturing unit 102 in the movable image capturing unit 100 to a video signal. The video signal processing unit 203 processes the video signal output from the image signal processing unit 202 in accordance with usage thereof. Video signal processing includes image cut-out, electronic image stabilization operation by means of rotation processing, and object detection processing for detecting an object (face).

The sound signal processing unit 204 performs sound processing on the digital signal output from the sound input unit 104. If the sound input unit 104 is a microphone for outputting an analog signal, the sound signal processing unit 204 may include a configuration for converting an analog signal to a digital signal. Note that the details of the sound signal processing unit 204, including the sound input unit 104, will be described later with reference to FIG. 2.

The operation unit 205 functions as a user interface between the image capturing apparatus 1 and a user, and is constituted by various switches and buttons, or the like. The storage unit 206 stores various kinds of data, such as video information obtained through shooting. The display unit 207 includes a display, such as an LCD, and displays an image as needed based on a signal output from the video signal processing unit 203. The display unit 207 also functions as a portion of a user interface by displaying various menus or the like. The external input-output terminal unit 208 receives inputs of and outputs a communication signal and a video signal from and to an external device. The sound reproduction unit 209 includes a speaker, and converts sound data to an electrical signal to reproduce sound. The power source unit 210 is a power supply source needed to drive the entire image capturing apparatus (i.e. each element thereof), and is a rechargeable battery in this embodiment.

The power source control unit 211 controls supply and interruption of power from the power source unit 210 to the aforementioned constituent elements in accordance with the state of the image capturing apparatus 1. Some elements are not used depending on the state of the image capturing apparatus 1. The power source control unit 211 has a function of interrupting power to unnecessary elements in accordance with the state of the image capturing apparatus 1 to suppress power consumption, under the control of the central processing unit 201. Note that power supply/interruption will become apparent from a later description.

The position detecting unit 212 is constituted by a gyroscope, an acceleration sensor, a GPS, or the like, and detects movement of the image capturing apparatus 1. The position detecting unit 212 is provided such that the image capturing apparatus 1 can also work in the case of being attached to the user's body. The rotation control unit 213 generates and outputs a signal for driving the vibrators 11 to 13 in accordance with an instruction from the central processing unit 201. The vibrators 11 to 13 are constituted by piezoelectric elements, and vibrate in accordance with a drive signal applied by the rotation control unit 213. The vibrators 11 to 13 constitute a rotation drive unit (pan-tilt drive unit). As a result, the movable image capturing unit 100 performs the panning operation and the tilting operation in a direction instructed by the central processing unit 201.

The wireless communication unit 214 transmits data such as image data, conforming to a wireless communication standard such as Wi-Fi (registered trademark) or BLE (Bluetooth (registered trademark) Low Energy).

Figure 2:
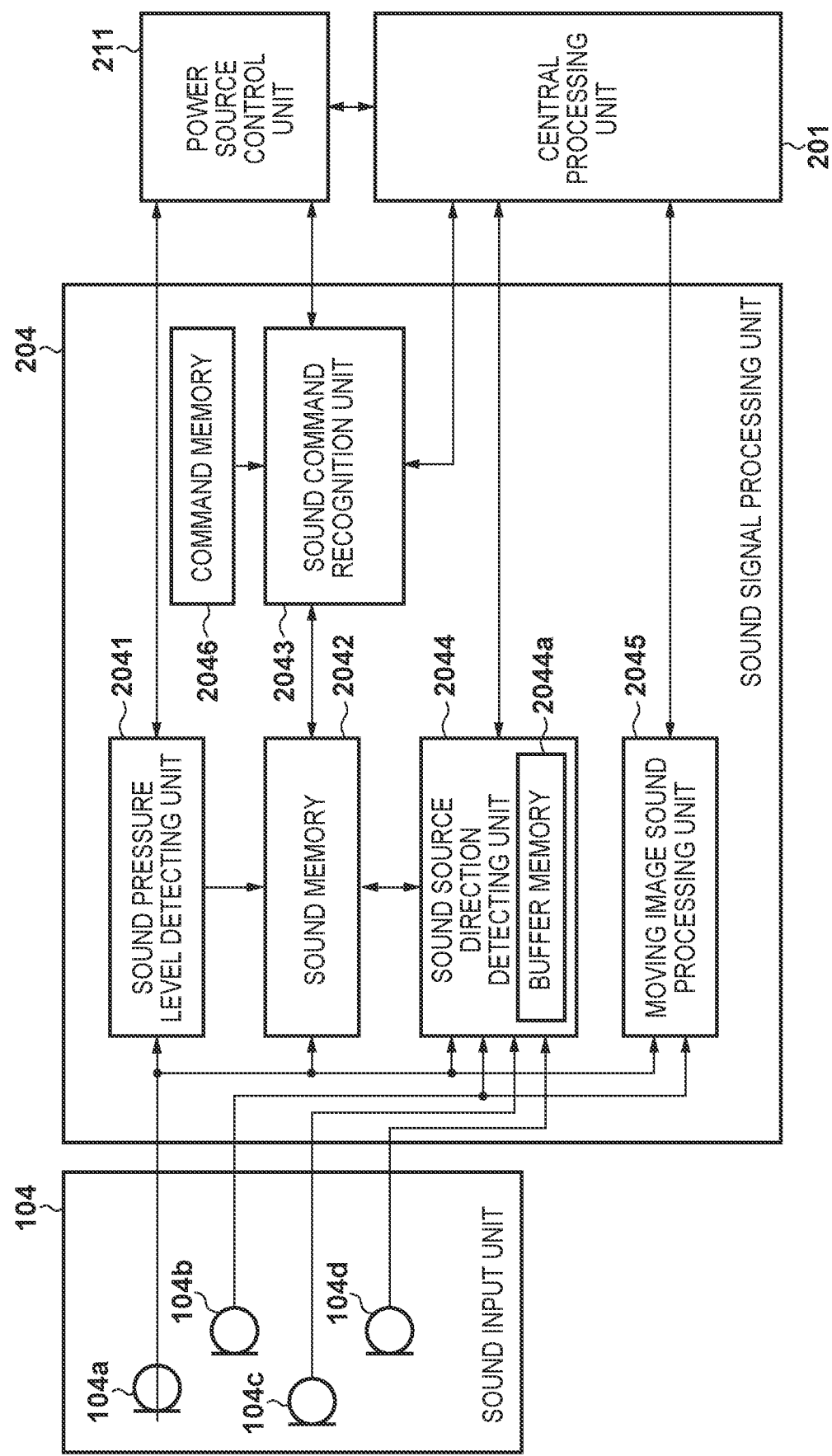
FIG. 2 is a detailed block diagram of a sound input unit and a sound signal processing unit according to the embodiments.

Next, a description will be given, with reference to FIG. 2, of a configuration of the sound input unit 104 and the sound signal processing unit 204, as well as sound source direction detection processing, according to this embodiment. FIG. 2 shows a configuration of the sound input unit 104 and the sound signal processing unit 204, as well as a connection relationship between the sound signal processing unit 204, the central processing unit 201, and the power source control unit 211.

The sound input unit 104 is constituted by four nondirectional microphones, which are microphone 104a, microphone 104b, microphone 104c, and microphone 104d. Each of the microphones contains an A/D converter, collects sound at a preset sampling rate (command detection, direction detection processing: 16 kHz, moving image recording: 48 kHz), and outputs a sound signal of the collected sound as digital sound data using the contained A/D converter. Although, in this embodiment, the sound input unit 104 is constituted by four digital microphones, the sound input unit 104 may alternatively be constituted by microphones that output analog signals. In the case of analog microphones, corresponding A/D converters need only be provided in the sound signal processing unit 204. Although the number of microphones in this embodiment is four, the number of microphones need only be three or more.

The microphone 104a is unconditionally supplied with power if the power source of the image capturing apparatus 1 is ON, and enters a sound-collectable state. On the other hand, the other microphones 104b, 104c, and 104d are subjected to power supply/interruption by the power source control unit 211 under the control of the central processing unit 201, and power is interrupted in an initial state after the power of the image capturing apparatus 1 has turned on.

The sound signal processing unit 204 is constituted by a sound pressure level detecting unit 2041, a sound memory 2042, a sound command recognition unit 2043, a sound source direction detecting unit 2044, a moving image sound processing unit 2045, and a command memory 2046.

The sound pressure level detecting unit 2041 supplies a signal indicating that sound has been detected to the power source control unit 211 and the sound memory 2042 when the sound pressure level of sound data output from the microphone 104a exceeds a preset threshold.

The power source control unit 211 supplies power to the sound command recognition unit 2043 if the signal indicating that sound has been detected is received from the sound pressure level detecting unit 2041.

The sound memory 2042 is subjected to power supply/interruption by the power source control unit 211 under the control of the central processing unit 201. The sound memory 2042 is also a buffer memory for temporarily storing sound data output from the microphone 104a. If the sampling rate of the microphone 104a is 16 kHz, the microphone 104a outputs sound data of 2 bytes (16 bits) per sampling, and the longest sound command is five seconds, the sound memory 2042 has a capacity of approximately 160 kilobytes ($\approx 5 \times 16 \times 1000 \times 2$). If the sound memory 2042 is filled with sound data from the microphone 104a, old sound memory is overwritten with new sound data. As a result, the sound memory 2042 holds sound data for a predetermined latest period (approximately 5 seconds in the above example). The sound memory 2042 also stores sound data from the microphone 104a in a sampling data area, with reception of the signal indicating that sound has been detected from the sound pressure level detecting unit 2041 acting as a trigger.

Figure 8:
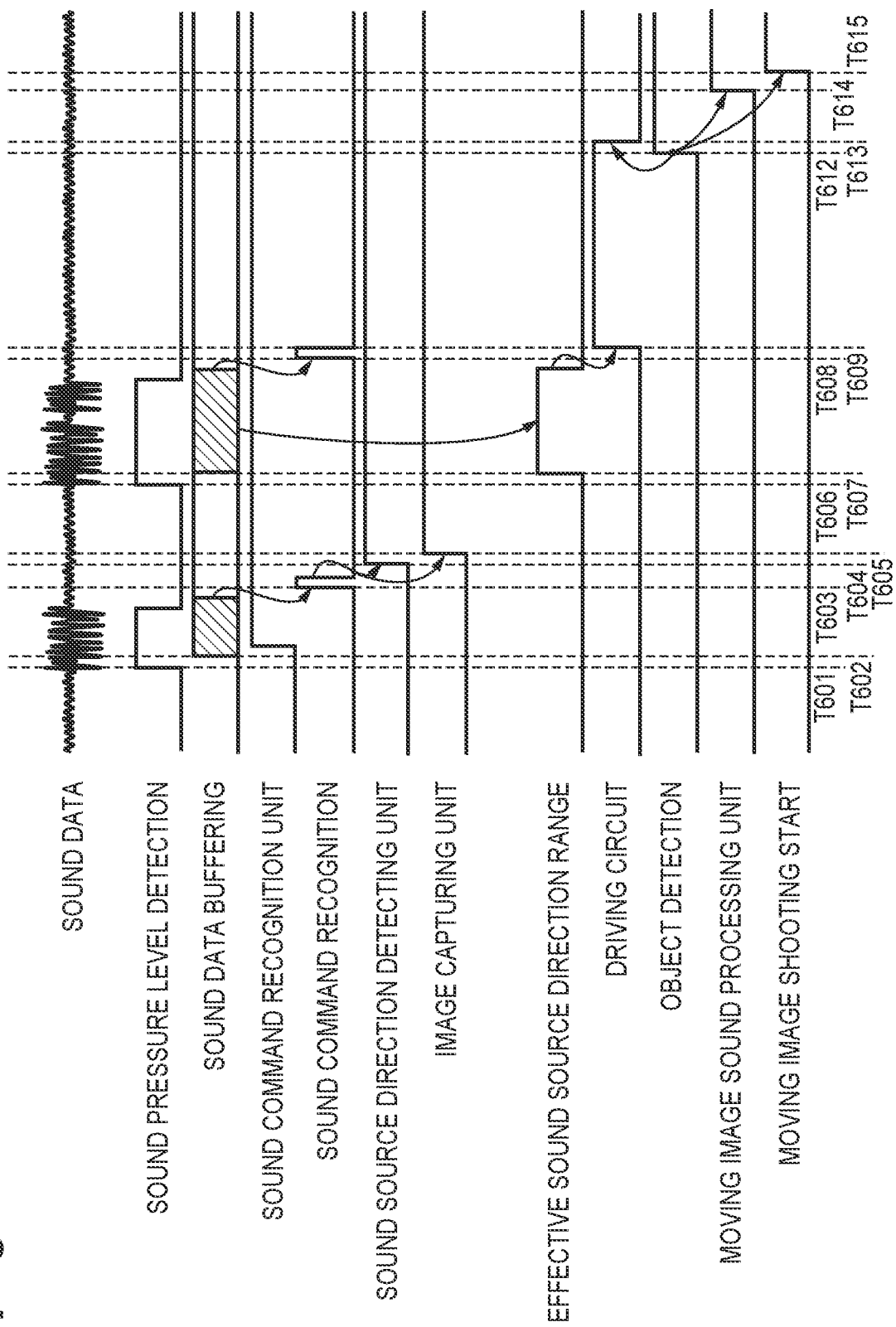
FIG. 8 is a timing chart from a start to a moving image shooting start command according to the embodiments.

The command memory 2046 is constituted by a nonvolatile memory, and stores (registers), in advance, information associated with sound commands recognized by the image capturing apparatus. Although the details will be described later, there are types of sound commands stored in the command memory 2046 as shown in FIG. 8, for example, and information regarding a plurality of types of commands, such as a start command, is stored in the command memory 2046.

The sound command recognition unit 2043 is subjected to power supply/interruption by the power source control unit 211 under the control of the central processing unit 201. Note that sound recognition itself is a known technique, and a description thereof is omitted here accordingly. The sound command recognition unit 2043 references the command memory 2046 and performs processing to recognize sound data stored in the sound memory 2042. The sound command recognition unit 2043 then determines whether or not sound data collected by the microphone 104a corresponds to a sound command, and whether or not this sound data coincides with any of the sound commands stored in the command memory 2046. When the sound command recognition unit 2043 detects sound data that coincides with any of the sound commands stored in the command memory 2046, the sound command recognition unit 2043 supplies, to the central processing unit 201, information indicating which of the commands has been detected, and the first and last addresses of the sound data that determines the sound command (or the timing at which the sound command was accepted) in the sound memory 2042.

The sound source direction detecting unit 2044 is subjected to power supply/interruption of the power source control unit 211 under the control of the central processing unit 201. Also, the sound source direction detecting unit 2044 periodically performs processing to detect a direction in which a sound source is present, based on sound data from the four microphones 104a to 104d. The sound source direction detecting unit 2044 contains a buffer memory 2044a, and stores information indicating the detected sound source direction in the buffer memory 2044a. Note that the period (e.g. 16 kHz) in which the sound source direction detecting unit 2044 performs sound source direction detection processing may be sufficiently longer than the sampling period of the microphone 104a. However, the buffer memory 2044a has a capacity for storing sound source direction information for the same period as the period of sound data that can be stored in the sound memory 2042.

The moving image sound processing unit 2045 is subjected to power supply/interruption of the power source control unit 211 under the control of the central processing unit 201. The moving image sound processing unit 2045 receives input of two sets of sound data from the microphones 104a and 104b, of the four microphones, as stereo sound data, and performs sound processing for moving image sound, such as various kinds of filtering processing, wind noise reduction, driving sound elimination, stereo enhancement, ALC (Auto Level Control), and compression processing. Although the details will become apparent from the later description, in this embodiment, the microphone 104a functions as an L-channel stereo microphone, and the microphone 104b functions as an R-channel stereo microphone.

Note that, as for the connection between the microphones of the sound input unit 104 and the blocks in the sound signal processing unit 204, FIG. 2 shows the minimum necessary connection of the four microphones, giving consideration to power consumption and the circuitry. However, the plurality of microphones may also be shared by each block included in the sound signal processing unit 204 as long as power and the circuitry permit. Although, in this embodiment, the microphone 104a is connected while serving as a reference microphone, any of the microphones may be used as a reference microphone.

Figure 3A:
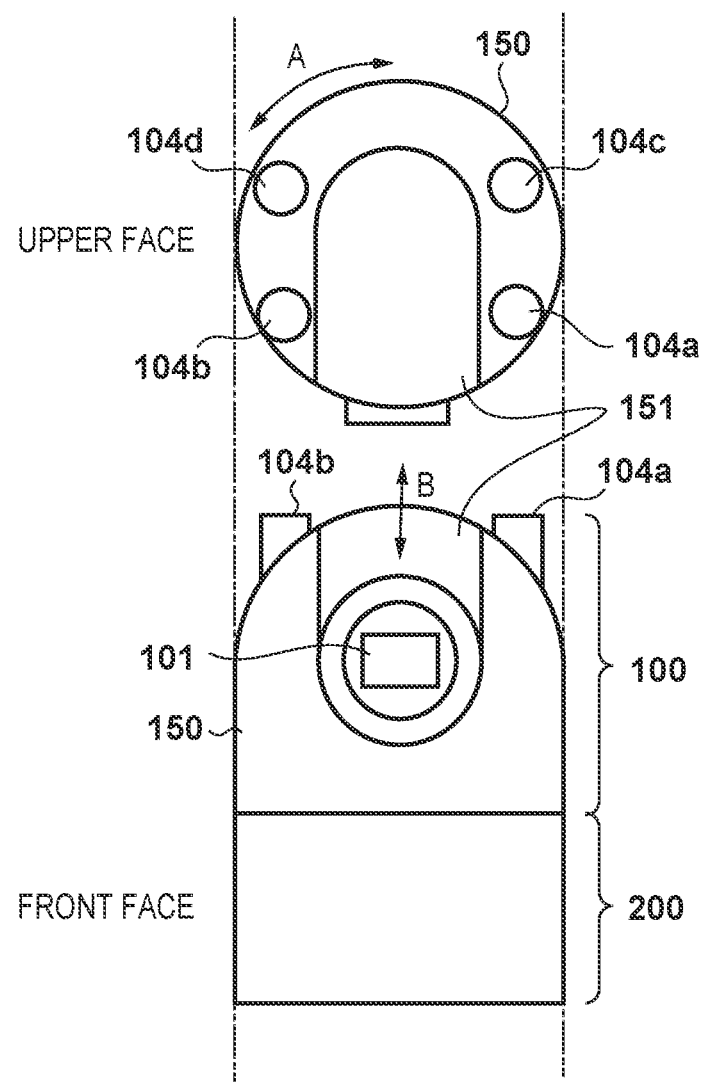
FIGS. 3A to 3E show external views and usage examples of the image capturing apparatus according to the embodiments.

External views and usage examples of the image capturing apparatus 1 will now be described with reference to FIGS. 3A to 3E. FIG. 3A shows an upper view and a front view of the external appearance of the image capturing apparatus 1 according to this embodiment. The movable image capturing unit 100 in the image capturing apparatus 1 has a substantially hemispherical shape. When a plane parallel to a bottom face is assumed as a horizontal plane and the angle thereof is 0 degree, the movable image capturing unit 100 has a cut-out window that extends over a range from −20 degrees to 90 degrees, which indicates a vertical direction, and has a first housing 150, which can rotate through 360 degrees within the horizontal plane denoted by the arrow A in FIG. 3A. The movable image capturing unit 100 also has a second housing 151, which can rotate along this cut-out window together with the lens unit 101 and the image capturing unit 102 in a range from the horizontal angle to the vertical angle as indicated by the arrow B in FIG. 3A. Here, the rotational operation of the first housing 150 denoted by the arrow A and the rotational operation of the second housing 151 denoted by the arrow B correspond to the panning operation and the tilting operation, respectively, and these operations are realized by driving the vibrators 11 to 13. Note that the range in which the image capturing apparatus according to this embodiment can tilt is from −20 degrees to +90 degrees, as mentioned above.

The microphones 104a and 104b are arranged at positions on a front side with the cut-out window in the first housing 150 therebetween. The microphones 104c and 104d are provided on the rear side of the first housing 150. As shown in FIG. 3A, even if the panning operation is performed with the first housing 150 in any direction along the arrow A with the second housing 151 fixed, the relative positions of the microphones 104a and 104b with respect to the lens unit 101 and the image capturing unit 102 are unchanged. That is to say, the microphone 104a is always located on the left side, and the microphone 104b is always located on the right side, relative to the image capturing direction of the image capturing unit 102. Also, the microphone 104a and the microphone 104b are symmetrically arranged relative to the image capturing direction of the image capturing unit 102, and thus, the microphone 104a has a function of receiving input to the L-channel of the stereo microphone, and the microphone 104b has a function of receiving input to the R-channel of the stereo microphone. For this reason, a space expressed in an image captured by the image capturing unit 102 and sound fields obtained by the microphones 104a and 104b can maintain a fixed relationship.

Note that the four microphones 104a, 104b, 104c, and 104d according to this embodiment are arranged at positions corresponding to vertexes of a rectangular when viewed from above the image capturing apparatus 1, as shown in FIG. 3A. Also, it is assumed that these four microphones are located in a single horizontal plane in FIG. 3A, but may be more or less shifted.

The distance between the microphone 104a and the microphone 104b is greater than the distance between the microphone 104a and the microphone 104c. It is desirable that the distance between adjacent microphones is approximately 10 mm to 30 mm. Although, in this embodiment, the number of microphones is four, the number of microphones need only be three or more as long as the microphones are not arranged in a straight line. The arrangement positions of the microphones 104a to 104d in FIG. 3A is an example, and the arrangement method may be changed as appropriate in accordance with mechanical constraints or design constraints.

Figure 3B:
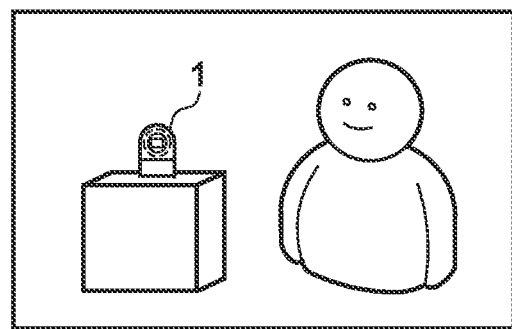
Figure 3C:
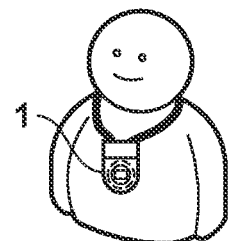
Figure 3D:
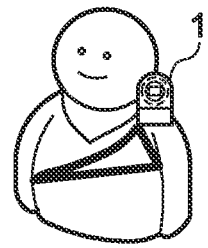
Figure 3E:
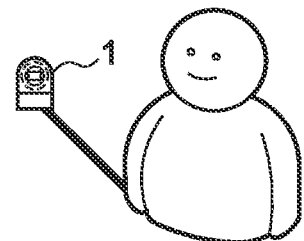

FIGS. 3B to 3E show usage modes of the image capturing apparatus 1 according to this embodiment. FIG. 3B shows the case where the image capturing apparatus 1 is placed on a desk or the like, and illustrates a usage mode aimed to shoot an image of a photographer himself and an object thereearound. FIG. 3C shows an example in which the image capturing apparatus 1 is hung around the neck of the photographer, and illustrates a usage mode mainly aimed to shoot an image of the front side of the photographer while moving. FIG. 3D shows a usage example in which the image capturing apparatus 1 is fixed to a shoulder of the photographer, and illustrates a usage mode aimed to shoot an image of the surroundings of the photographer on the front, rear, and right sides. FIG. 3E shows a usage example in which the image capturing apparatus 1 is fixed to an end of a bar held by the user, and illustrates a usage mode aimed to shoot an image while moving the image capturing apparatus 1 to a position at which the user wants to shoot the image (e.g. a high position or a position that cannot be reached by a hand).

The panning operation and the tilting operation of the image capturing apparatus 1 according to this embodiment will be described in more detail with reference to FIG. 4.

Although the description here is premised on the usage example in which the image capturing apparatus 1 is placed in a fixed manner as shown in FIG. 3B, the same also applies in other usage examples.

Figure 4:
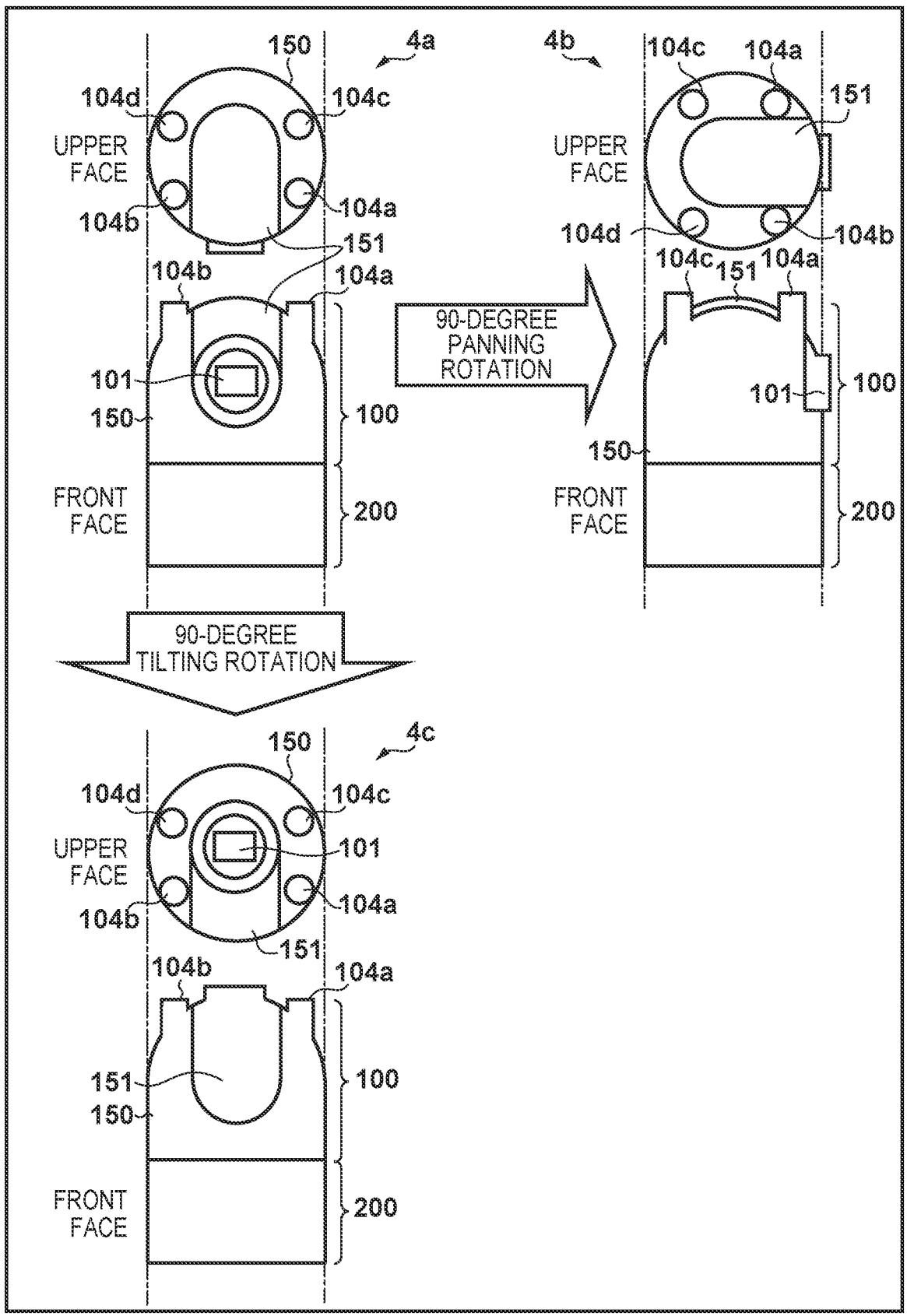
FIG. 4 illustrates a panning operation and a tilting operation of the image capturing apparatus according to the embodiments.

4a in FIG. 4 denotes a state where the lens unit 101 is oriented horizontally. If, in the state denoted by 4a FIG. 4 that is assumed as an initial state, the panning operation is performed with the first housing 150 by 90 degrees counterclockwise when seen from above, a state denoted by 4b in FIG. 4 is entered. On the other hand, if, in the initial state denoted by 4a in FIG. 4, the tilting operation is performed with the second housing 151 by 90 degrees, a state denoted by 4c in FIG. 4 is entered. The rotation of the first housing 150 and the second housing 151 is realized by vibration of the vibrators 11 to 13 that are driven by the rotation control unit 213, as already described.

Figure 5A:
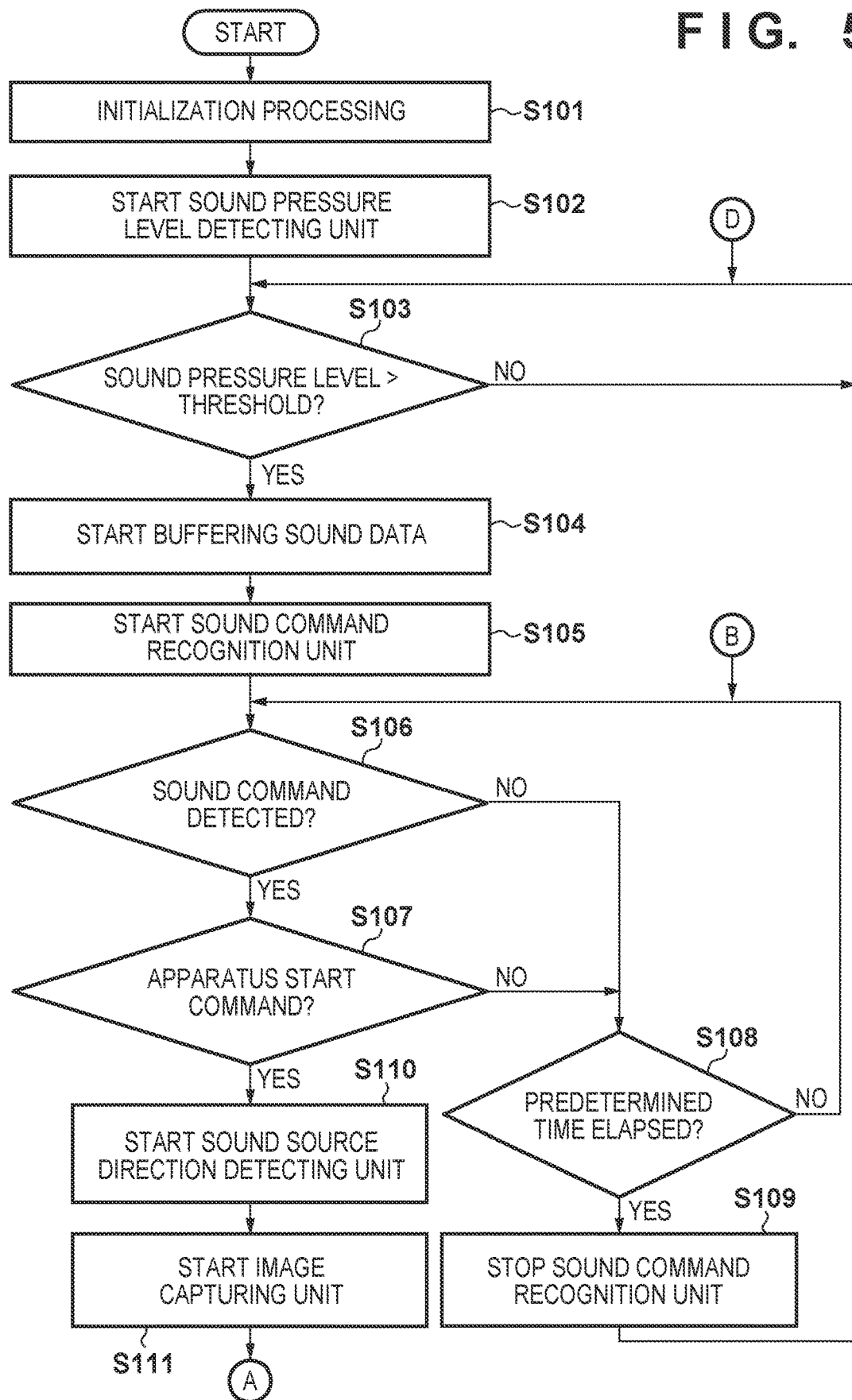
FIGS. 5A and 5B are flowcharts illustrating a processing procedure of a central processing unit according to the embodiments.
Figure 5B:
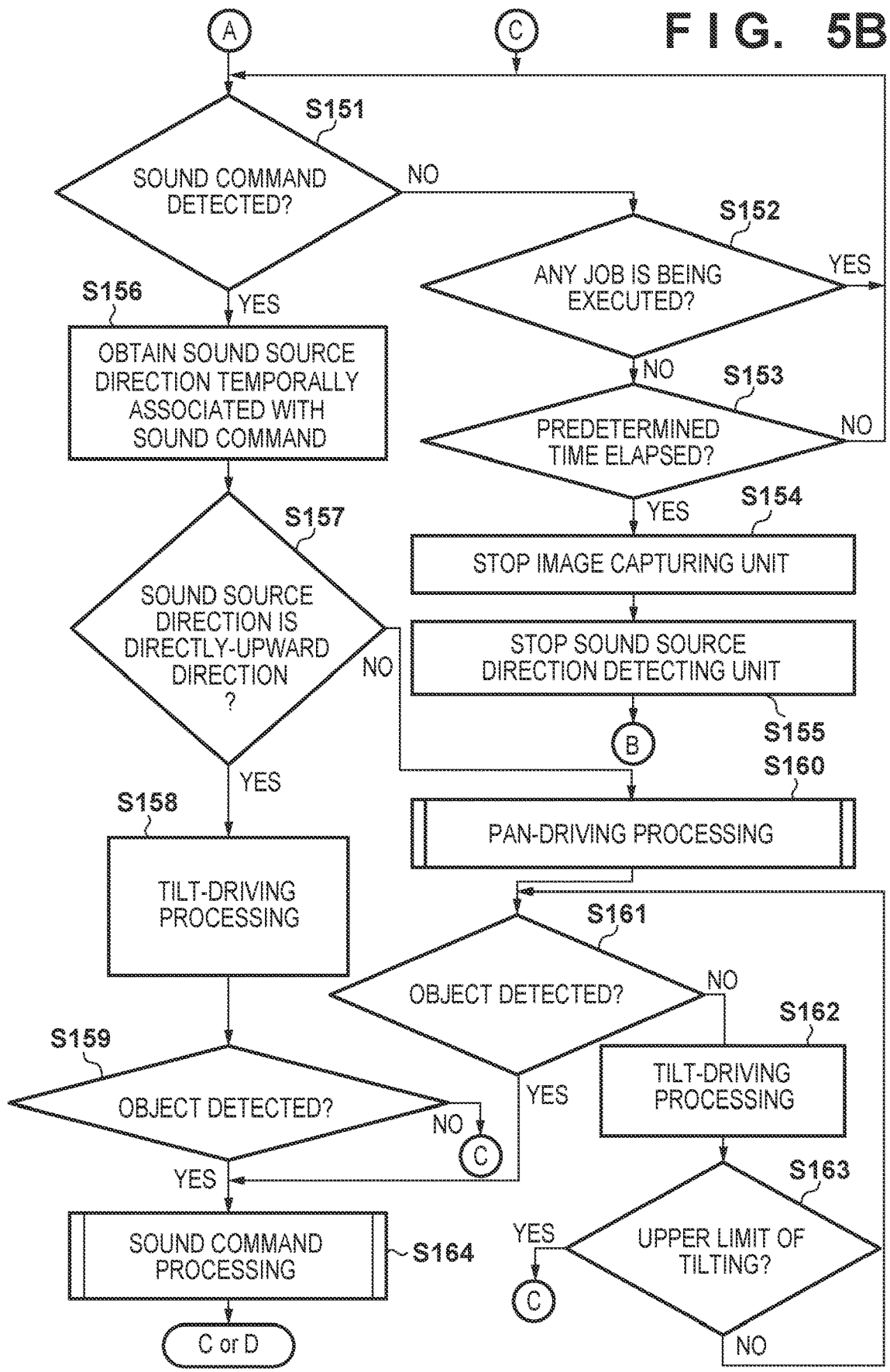

Next, a processing procedure of the central processing unit 201 of the image capturing apparatus 1 according to this embodiment will be described in accordance with the flowcharts in FIGS. 5A and 5B. Processing shown in FIGS. 5A and 5B is performed by the central processing unit 201 when a main power source of the image capturing apparatus 1 is turned on.

In step S101, the central processing unit 201 performs processing to initialize the image capturing apparatus 1. During this initialization processing, the central processing unit 201 determines a directional component in a horizontal plane in the current image capturing direction of the image capturing unit 102 of the movable image capturing unit 100 as a reference angle (0 degree) for the panning operation.

In the following description, a component in the horizontal plane of the image capturing direction after the panning operation of the movable image capturing unit 100 has been performed will be expressed with a relative angle with respect to the reference angle. Also, a component in the horizontal plane of a sound source direction detected by the sound source direction detecting unit 2044 will also be expressed with a relative angle with respect to the reference angle. Although the details will be described later, the sound source direction detecting unit 2044 also determines whether or not a sound source is present in a directly-upward direction relative to the image capturing apparatus 1 (i.e. in an axial direction of a rotation axis in the panning operation).

Note that, at this stage, power to the sound memory 2042, the sound source direction detecting unit 2044, the moving image sound processing unit 2045, and the microphones 104b to 104d is interrupted.

After the initialization processing has finished, in step S102, the central processing unit 201 controls the power source control unit 211 to start supplying power to the sound pressure level detecting unit 2041 and the microphone 104a. As a result, based on sound data output from the microphone 104a, the sound pressure level detecting unit 2041 performs processing to detect the sound pressure level of sound before being converted to this sound data, and notifies the central processing unit 201 if it is determined that the sound pressure level of this sound exceeds a preset threshold. Note that this threshold is 60-dB SPL (Sound Pressure Level), for example, but may be changed by the image capturing apparatus 1 in accordance with an environment or the like, or may be narrowed to a necessary frequency band.

In step S103, the central processing unit 201 waits for sound whose sound pressure level exceeds the threshold being detected by the sound pressure level detecting unit 2041. If sound whose sound pressure level exceeds the threshold is detected, in step S104, the sound memory 2042 starts processing to receive and store the sound data from the microphone 104a.

In step S105, the central processing unit 201 controls the power source control unit 211 to start supplying power to the sound command recognition unit 2043. As a result, the sound command recognition unit 2043 starts processing to recognize the sound data that is stored in the sound memory 2042, while referencing the command memory 2046. If, as a result of the sound command recognition unit 2043 performing processing to recognize the sound data stored in the sound memory 2042, it is recognized that the recognized sound data coincides any of the sound commands in the command memory 2046, the sound command recognition unit 2043 notifies the central processing unit 201 of information including information for specifying the recognized sound command and information regarding the first and last addresses of the sound data that determines the recognized sound command in the sound memory 2042 (or regarding the timing at which the sound command was accepted).

In step S106, the central processing unit 201 determines whether or not the information indicating that a sound command was recognized has been received from the sound command recognition unit 2043. If not, the central processing unit 201 advances the processing to step S108, and determines whether or not the elapsed time since the sound command recognition unit 2043 was started has exceeded a preset threshold. As long as the elapsed time is smaller than or equal to the threshold, the central processing unit 201 waits for a sound command being recognized by the sound command recognition unit 2043. If the sound command recognition unit 2043 recognizes no sound command even after the time indicated by the threshold has elapsed, the central processing unit 201 advances the processing to step S109. In step S109, the central processing unit 201 controls the power source control unit 211 to interrupt power to the sound command recognition unit 2043. The central processing unit 201 then returns the processing to step S103.

On the other hand, if the central processing unit 201 has received information indicating that a sound command was recognized from the sound command recognition unit 2043, the central processing unit 201 advances the processing to step S107. In step S107, the central processing unit 201 determines whether or not the recognized sound command corresponds to a start command shown in FIG. 7. If it is determined that the recognized sound command is a command other than the start command, the central processing unit 201 advances the processing to step S108. If the recognized sound command is the start command, the central processing unit 201 advances the processing from step S107 to step S110.

In step S110, the central processing unit 201 controls the power source control unit 211 to start supplying power to the sound source direction detecting unit 2044 and the microphones 104b to 104d. As a result, the sound source direction detecting unit 2044 starts processing to detect a sound source direction based on sound data obtained at the same time from the four microphones 104a to 104d. Processing to detect a sound source direction is performed in a predetermined cycle. The sound source direction detecting unit 2044 stores, in the internal buffer memory 2044a, sound source direction information that indicates a detected sound source direction. At this time, the sound source direction detecting unit 2044 stores the sound source direction information in the buffer memory 2044a in association with the sound data such that it can be understood which portion of the sound data stored in the sound memory 2042 was used to determine the sound source direction information. Typically, the sound source direction and the addresses of the sound data in the sound memory 2042 may be stored in the buffer memory 2044a. Note that an angle that indicates a difference between the sound source direction and the above-described reference angle in the horizontal plane is used as the sound source direction information. Although the details will be described later, in the case where a sound source is located right above the image capturing apparatus 1, information indicating that the sound source is located in the directly-upward direction is set as the sound source direction information.

In step S111, the central processing unit 201 controls the power source control unit 211 to start supplying power to the image capturing unit 102 and the lens actuator control unit 103. As a result, the movable image capturing unit 100 starts functioning as an image capturing apparatus.

Next, in step S151, the central processing unit 201 determines whether or not information indicating that a sound command was recognized has been received from the sound command recognition unit 2043. If not, the central processing unit 201 advances the processing to step S152 and determines whether or not any job is currently being executed in accordance with an instruction from the user. Although the details will be apparent from the description of the flowchart in FIG. 6, moving image shooting/recording, tracking processing, or the like corresponds to a job. Here, the description is continued while assuming that no such job is currently being executed.

In step S153, it is determined whether or not the elapsed time since a sound command was recognized last time exceeds a preset threshold. If not, the central processing unit 201 returns the processing to step S151 and waits for a sound command being recognized. If no job is currently being executed, and no more sound command is recognized even after the elapsed time since a sound command was recognized last time has exceeded the threshold, the central processing unit 201 advances the processing to step S154. In step S154, the central processing unit 201 controls the power source control unit 211 to interrupt power to the image capturing unit 102 and the lens actuator control unit 103. Then, in step S155, the central processing unit 201 controls the power source control unit 211 to also interrupt power to the sound source direction detecting unit 2044, and returns the processing to step S106.

Here, it is assumed that the central processing unit 201 receives information indicating that a sound command was recognized from the sound command recognition unit 2043. In this case, the sound command recognition unit 2043 advances the processing from step S151 to step S156.

The central processing unit 201 according to this embodiment performs processing to place a person who has uttered the sound command within the field of view of the image capturing unit 102 in the movable image capturing unit 100, before executing a job corresponding to the recognized sound command. Then, the central processing unit 201 executes a job that is based on the recognized sound command, in a state where the person is in the field of view of the image capturing unit 102.

To realize the above processing, in step S156, the central processing unit 201 obtains the sound source direction information that is temporally associated with the sound command recognized by the sound command recognition unit 2043 from the buffer memory 2044a in the sound source direction detecting unit 2044. When recognizing a sound command, the sound command recognition unit 2043 notifies the central processing unit 201 of two addresses indicating the start and the end of the sound command in the sound memory 2042. The central processing unit 201 obtains sound source direction information detected within a period indicated by these two addresses, from the buffer memory 2044a. There may also be cases where a plurality of pieces of sound source direction information exists within the period indicated by the two addresses. In this case, the central processing unit 201 obtains the latest piece of sound source direction information out of these pieces, from the buffer memory 2044a. This is because a latter piece of sound source direction information more probably expresses the current position of the person who uttered this sound command.

In step S157, the central processing unit 201 determines whether or not the direction of the sound source indicated by the obtained sound information is the directly-upward direction relative to the image capturing apparatus. Note that the details of the determination about whether or not the sound source direction is right above the image capturing apparatus will be described later.

If the sound source is located in the directly-upward direction relative to the image capturing apparatus 1, the central processing unit 201 advances the processing to step S158. In step S158, the central processing unit 201 controls the rotation control unit 213 to rotate the second housing 151 of the movable image capturing unit 100 such that the image capturing direction of the lens unit 101 and the image capturing unit 102 is the directly-upward direction as denoted by 4c in FIG. 4. If the image capturing unit of the image capturing unit 102 is set to the directly-upward direction, in step S159, the central processing unit 201 receives a captured image from the video signal processing unit 203, and determines whether or not an object (a person's face) that acts as a sound source is present within the captured image. If not, the central processing unit 201 returns the processing to step S151. On the other hand, if an object is present within the captured image, the central processing unit 201 advances the processing to step S164, and executes the job corresponding to the already-recognized sound command. Note that the details of step S164 will be described later with reference to FIG. 6.

If, in step S157, the central processing unit 201 determines that the direction indicated by the sound information is a direction other than the directly-upward direction, the processing is advanced to step S160. In step S160, the central processing unit 201 controls the rotation control unit 213 performs the panning operation of the movable image capturing unit 100, and matches the current angle of the image capturing unit 102 in the horizontal plane to the angle in the horizontal plane indicated by the sound information. Then, in step S161, the central processing unit 201 receives a captured image from the video signal processing unit 203, and determines whether or not an object (face) that acts as a sound source is present within the captured image. If not, the central processing unit 201 advances the processing to step S162, and controls the rotation control unit 213 to perform the tilting operation of the movable image capturing unit 100 toward a target object. In step S163, the central processing unit 201 determines whether or not the angle of the tilting of the image capturing direction of the image capturing unit 102 has reached an upper limit in the tilting operation (90 degrees relative to the horizontal direction in this embodiment). If not, the central processing unit 201 returns the processing to step S161. Thus, the central processing unit 201 determines whether or not an object (face) that acts as a sound source is present within the captured image from the video signal processing unit 203, while performing the tilting operation. If no object is detected even after the angle of the tilting of the image capturing direction of the image capturing unit 102 has reached the upper limit of the tilting operation, the central processing unit 201 returns the processing from step S163 to step S151. On the other hand, if an object is present in the captured image, the central processing unit 201 advances the processing to step S164, and executes the job corresponding to the already-recognized sound command.

Next, the details of processing in step S164 will be described based on the flowchart in FIG. 6 and a sound command table shown in FIG. 7. Sound pattern data corresponding to sound commands, such as "Hi, Camera", shown in the sound command table in FIG. 7 is stored in the command memory 2046. Note that FIG. 7 shows typical sound commands. Note that sound commands are not limited thereto. It should be noted that the sound commands in the following description are sound commands detected at the timing in step S151 in FIG. 5B.

Initially, in step S201, the central processing unit 201 determines whether or not the sound command is the start command.

This start command is a sound command for causing the image capturing apparatus 1 to transition to an image-capturable state. This start command is a command for which a determination is performed in step S107 in FIG. 5A, and is not a command for causing a job for capturing an image to be executed. Accordingly, if the recognized sound command is the start command, the central processing unit 201 ignores this command and returns the processing to step S151.

In step S202, the central processing unit 201 determines whether or not the sound command is a stop command. The stop command is a command for causing the image capturing apparatus 1 to transition to a state of waiting for input of the start command from a series of image-capturable states. Accordingly, if the recognized sound command is the stop command, the central processing unit 201 advances the processing to step S211. In step S211, the central processing unit 201 controls the power source control unit 211 to interrupt power to the image capturing unit 102, the sound source direction detecting unit 2044, the sound command recognition unit 2043, the moving image sound processing unit 2045, the microphones 104b to 104d, and so on, that have already started, to stop these units. Then, the central processing unit 201 returns the processing to step S103 at the time of start.

In step S203, the central processing unit 201 determines whether or not the sound command is a still image shooting command. The still image shooting command is a command for making a request to execute a job to shoot and record one still image to the image capturing apparatus 1. Accordingly, if it is determined that the sound command is the still image shooting command, the central processing unit 201 advances the processing to step S212. In step S212, the central processing unit 201 records data of one still image captured by the image capturing unit 102 as a JPEG file, for example, in the storage unit 206. Note that, since a job for this still image shooting command is completed by shooting and recording one still image, the result of the already-described determination in step S152 in FIG. 5B is NO in the case of this job.

In step S204, the central processing unit 201 determines whether or not the sound command is a moving image shooting command. The moving image shooting command is a command for making a request to capture and record a moving image to the image capturing apparatus 1. If it is determined that the sound command is the moving image shooting command, the central processing unit 201 advances the processing to step S213. In step S213, the central processing unit 201 causes the image capturing unit 102 to start shooting and recording a moving image, and returns the processing to step S151. In this embodiment, a captured moving image is stored in the storage unit 206, but may alternatively be transmitted to a file server on a network via the external input-output terminal unit 208. Since the moving image shooting command is a command for continuing shooting and recording of a moving image, the result of the already-described determination in step S152 is YES in the case of a job for this command.

In step S205, the central processing unit 201 determines whether or not the sound command is a moving image shooting-end command. If the sound command is the moving image shooting-end command, and currently a moving image is actually being shot and recorded, the central processing unit 201 ends the recording (job). Then, the central processing unit 201 returns the processing to step S151.

In step S206, the central processing unit 201 determines whether or not the sound command is a tracking command. The tracking command is a command for making a request to causing the user to be continuously positioned in the image capturing direction of the image capturing unit 102, to the image capturing apparatus 1. If it is determined that the sound command is the tracking command, the central processing unit 201 advances the processing to step S214. In step S214, the central processing unit 201 starts controlling the rotation control unit 213 such that an object is continuously positioned at a central position of a video obtained by the video signal processing unit 203. Then, the central processing unit 201 returns the processing to step S151. As a result, the movable image capturing unit 100 performs the panning operation or the tilting operation to track the moving user. However, although the movable image capturing unit 100 tracks the user, it does not record a captured image. During the tracking, the result of the already-described determination in step S152 in FIG. 5B is YES. Only after receiving a tracking-end command, the central processing unit 201 ends shooting and recording of this moving image. Note that, for example, a job for the still image shooting command or the moving image shooting command may also be executed during the tracking.

In step S207, the central processing unit 201 determines whether or not the sound command is a tracking-end command. If the sound command is the tracking-end command, and currently tracking is actually being performed, the central processing unit 201 ends the recording (job). Then, the central processing unit 201 returns the processing to step S151.

In step S208, the central processing unit 201 determines whether or not the sound command is an automatic moving image shooting command. If it is determined that the sound command is the automatic moving image shooting command, the central processing unit 201 advances the processing to step S217. In step S217, the central processing unit 201 causes the image capturing unit 102 to start shooting and recording a moving image, and returns the processing to step S151. The job executed for this automatic moving image shooting command differs from a job executed for the already-described moving image shooting command in that a moving image is shot and recorded while orienting the image capturing direction of the lens unit 101 toward the sound source direction of an uttered voice every time a voice is uttered. For example, in an environment of a meeting where there are a plurality of speakers, every time words are uttered, a moving image is recorded while performing the panning operation and the tilting operation to include a corresponding speaker in the angle of view of the lens unit 101. Note that, in this case, a sound command for ending a job is not accepted while the job for this automatic moving image shooting command is being executed. This job is ended by an operation made to a predetermined switch that is provided in the operation unit 205. Also, while this job is being executed, the central processing unit 201 stops the sound command recognition unit 2043. Then, the central processing unit 201 causes the movable image capturing unit 104 to perform the panning operation and the tilting operation while referencing sound source direction information detected by the sound source direction detecting unit 2044 at the timing at which a sound pressure level that exceeds the threshold is detected by the sound pressure level detecting unit 2041.

In step S209, the central processing unit 201 determines whether or not the sound command is an intermittent front shooting command. For example, the central processing unit 201 determines whether or not the sound command is "shoot front". If it is determined that the sound command is the intermittent front image capturing shooting command, the central processing unit 201 advances the processing to step S217. In step S217, the central processing unit 201 intermittently continues shooting of an image of the front side during a period in which a job to shoot a still image of the front side of the person who is wearing the image capturing apparatus 1, at preset time intervals. Accordingly, there is no command for ending the job. This job is ended by an operation made to a predetermined switch that is provided in the operation unit 205. To move to step S217, the image capturing apparatus 1 determines the front side of the person who is wearing the image capturing apparatus 1, and thereafter executes the job. The details of this front determination processing will be described later.

Figure 6:
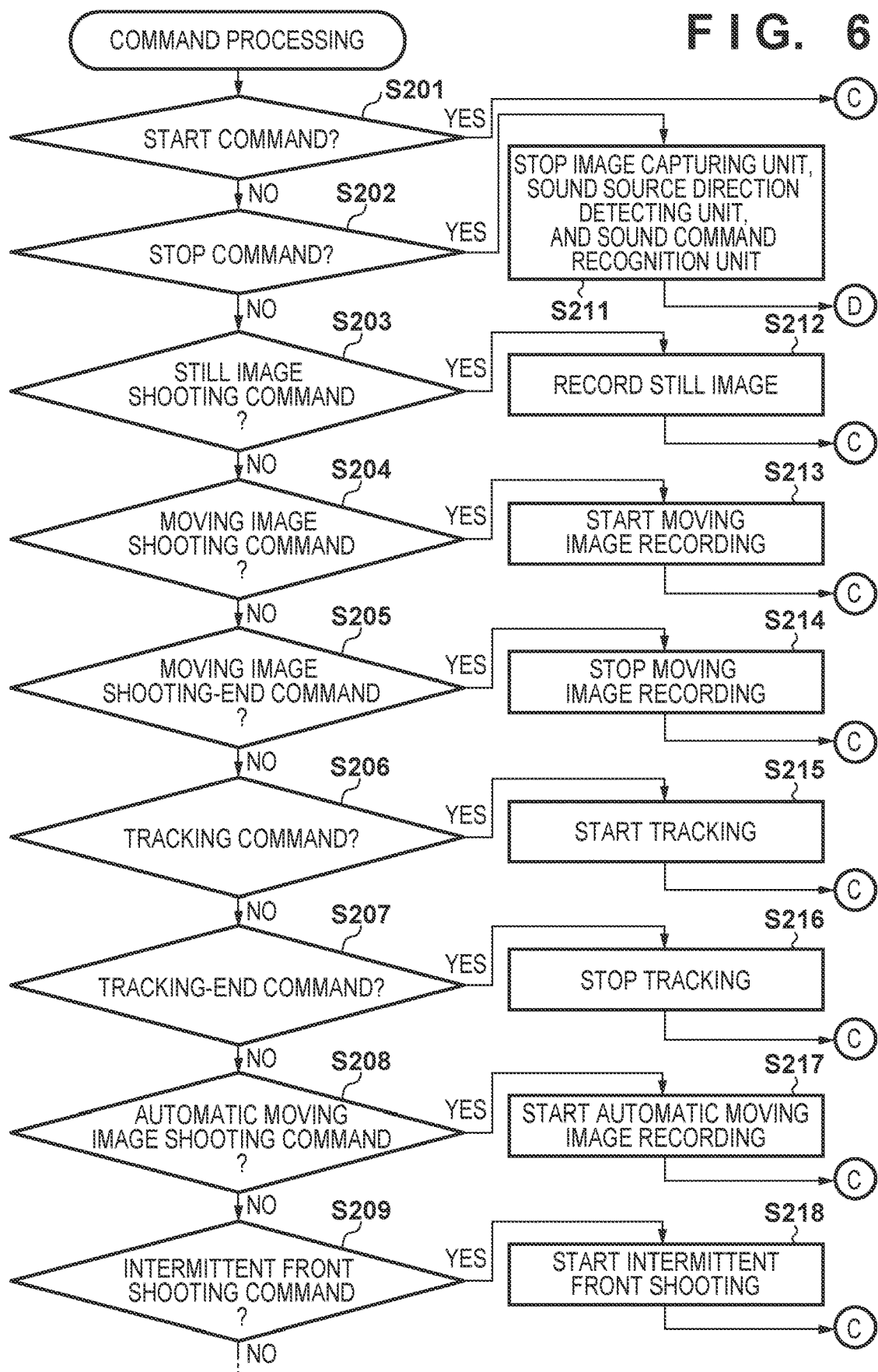
FIG. 6 is a flowchart illustrating the details of sound command processing in FIG. 5B.

Although not shown in FIG. 6, if the recognized sound command is an enlargement command, the central processing unit 201 controls the lens actuator control unit 103 to increase the current zoom magnification by a preset value. Also, if the recognized sound command is the reduction command, the central processing unit 201 controls the lens actuator control unit 103 to reduce the current zoom magnification by a preset value. Note that, when the lens unit 101 is already at the telephoto end or the wide end, a further enlargement ratio or reduction ratio cannot be set. Accordingly, if such a sound command is received, the central processing unit 201 ignores this sound command.

Sound command processing is as described above, and a description of processing for sound commands other than the aforementioned ones, which is executed in steps after step S209, is omitted here.

Here, an example of a processing sequence starting from turning-on of the main power source of the image capturing apparatus 1 according to this embodiment will be described in accordance with the timing chart shown in FIG. 8.

Upon the main power source of the image capturing apparatus 1 being turned on, the sound pressure level detecting unit 2041 starts processing to detect the sound pressure level of sound data from the microphone 104a. It is assumed that, at timing T601, the user starts uttering the start command "Hi, Camera". As a result, the sound pressure level detecting unit 2041 detects a sound pressure that exceeds the threshold. With this acting as a trigger, at timing T602, the sound memory 2042 starts storing sound data from the microphone 104a, and the sound command recognition unit 2043 starts recognizing the sound command. After the user ends uttering the start command "Hi, Camera", at timing T603, the sound command recognition unit 2043 recognizes this sound command and specifies that the recognized sound command is the start command.

With the recognition of the start command acting as a trigger, at timing T603, the central processing unit 201 starts supplying power to the sound source direction detecting unit 2044. At timing T604, the central processing unit 201 also starts supplying power to the image capturing unit 102.

It is assumed that, at timing T606, the user starts uttering "Movie start", for example. In this case, sound data obtained from the timing of starting the utterance is sequentially stored in the sound memory 2042 from timing T607. Then, at timing T608, the sound command recognition unit 2043 recognizes the sound data as a sound command indicating "Movie start". The sound command recognition unit 2043 notifies the central processing unit 201 of the addresses at the start and the end of the sound data indicating "Movie start" in the sound memory 2042, and the recognition result. The central processing unit 201 determines the range indicated by the received addresses at the start and the end as an effective range. Then, the central processing unit 201 extracts the latest sound source direction information from the effective range in the buffer 2044a in the sound source direction detecting unit 2044, and, at timing T609, the central processing unit 201 controls the rotation control unit 213 to start the panning operation and the tilting operation of the movable image capturing unit 100 based on the extracted information.

During the panning operation and the tilting operation of the movable image capturing unit 100, if, at timing T612, the image signal processing unit 202 detects an object (face) in an image generated using the image capturing unit 102, the central processing unit 201 stops the panning operation and the tilting operation (timing T613). Also, at timing T614, the central processing unit 201 supplies power to the moving image sound processing unit 2045 such that the microphones 104a and 104b enter a state of collecting stereo sound. At timing T615, the central processing unit 201 starts shooting and recording a moving image with sound.

Next, a description will be given of processing to detect a sound source direction performed by the sound source direction detecting unit 2044 according to this embodiment. This processing is performed cyclically and continuously after step S110 in FIG. 5A.

Figure 9A:
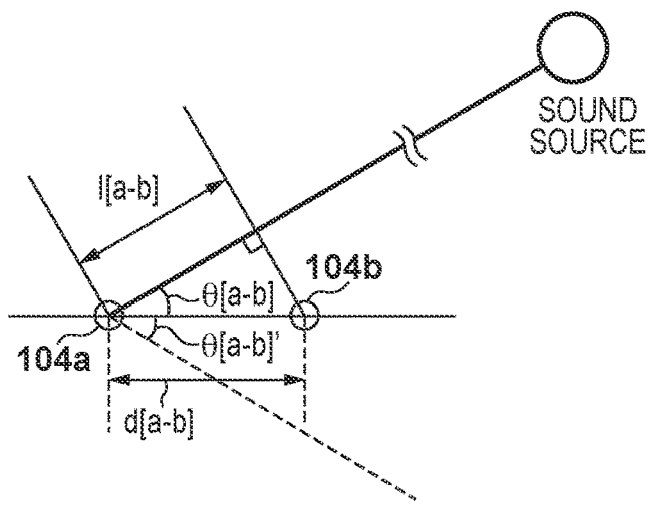
FIGS. 9A to 9C illustrate a sound source direction detection method according to the embodiments.

First, a description will be given, with reference to FIG. 9A, of simplified sound source direction detection using two microphones, namely the microphones 104a and 104b. In FIG. 9A, it is assumed that the microphones 104a and 104b are arranged on a flat surface (i.e. a flat surface perpendicular to the rotation axis for the panning operation). The distance between the microphones 104a and 104b is expressed as d[a–b]. It is assumed that the distance between the image capturing apparatus 1 and the sound source is sufficiently larger than the distance d[a–b]. In this case, delay time in sound between the microphone 104a and the microphone 104b can be specified by a comparison therebetween.

A distance I[a–b] can be specified by multiplying the arrival delay time by the speed of sound (340 m/s in the air). As a result, the sound source direction angle θ[a–b] can be specified by the following equation.

$$\theta[a-b] = a\cos(I[a-b]/d[a-b])$$

However, it cannot be distinguished which of the obtained sound source directions θ[a–b] and θ[a–b]' (FIG. 9A) the sound source direction obtained using the two microphones is. That is to say, which of the two sound source directions is the correct one cannot be specified.

Figure 9B:
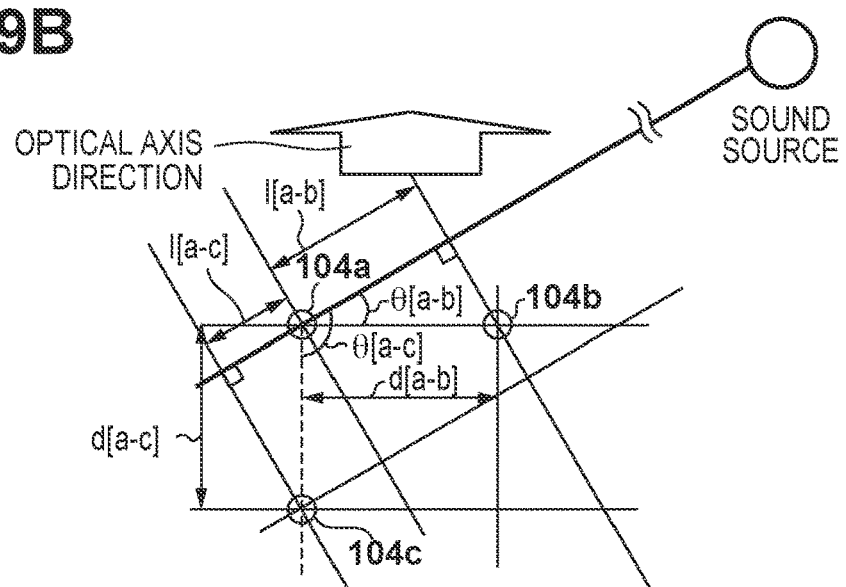
Figure 9C:
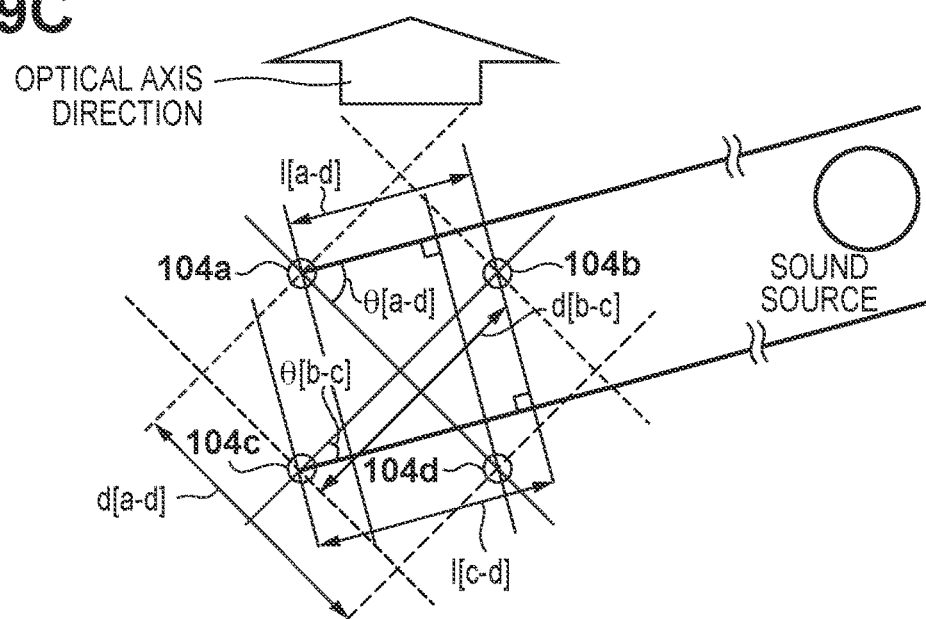

A method of detecting the sound source direction according to this embodiment will now be described with reference to FIGS. 9B and 9C. Specifically, two sound source directions can be estimated with two microphones, and these two directions are dealt with as provisional directions. Then, sound source directions are also obtained with other two microphones to obtain two provisional directions. A direction that is common to these provisional directions is determined as the sound source direction to be obtained. It is assumed that the upward direction in FIGS. 9B and 9C is the image capturing direction of the movable image capturing unit 100. The image capturing direction of the movable image capturing unit 100 can also be rephrased as the optical axis direction (main axis direction) of the lens unit 101.

FIG. 9B illustrates a method performed using three microphones. A description will be given using the microphones 104a, 104b, and 104c. In the case of the arrangement shown in FIG. 3A, a direction perpendicular to the direction in which the microphones 104a and 104b are arranged is the image capturing direction of the lens unit 101.

As described with reference to FIG. 9A, the distance d[a–b] is known from the microphones 104a and 104b, and θ[a–b] can be specified if the distance I[a–b] can be specified from sound data. Since the distance d[a–c] between the microphones 104a and 104c is also known, the distance I[a–c] can also be specified from sound data, and θ[a–c] thus can be specified. If θ[a–b] and θ[a–c] can be calculated, a direction that is common to the microphones 104a, 104b, and 104c in the two-dimensional plane in which the microphones 104a, 104b, and 104c are arranged (i.e. a plane perpendicular to the rotation axis for the panning operation) can be determined as a correct sound utterance direction.

A method of determining a sound source direction using four microphones will now be described with reference to FIG. 9C. Due to the arrangement of the microphones 104a, 104b, 104c, and 104d shown in FIG. 3A, a direction perpendicular to the direction in which the microphones 104a and 104b are arranged is the image capturing direction (optical axis direction) of the lens unit 101. In the case of using four microphones, a sound source direction can be accurately calculated using two pairs of microphones that are located diagonally, namely the pair of the microphones 104a and 104d and the pair of the microphones 104b and 104c.

Since the distance d[a–d] between the microphones 104a and 104d is known, the distance I[a–d] can be specified from sound data, and thus, θ[a–d] can also be specified.

Furthermore, since the distance d[b–c] between the microphones 104b and 104c is also known, the distance I[b–c] can be specified from sound data, and thus, θ[b–c] can be specified.

Accordingly, if θ[a–d] and θ[b–c] can be obtained, a correct sound utterance direction can be detected on the two-dimensional plane in which the microphones are arranged.

Furthermore, by increasing the number of detection angles, such as θ[a–b] and θ[c–d], the accuracy of the angle at which a direction is detected can also be increased.

The microphones 104a, 104b, 104c, and 104d are arranged at four vertexes of a rectangle, as shown in FIG. 3A, to perform processing as described above. Note that the number of microphones does not necessarily need to be four unless these microphones are arranged straight, and may be three.

A disadvantage of the above method is that only a sound source direction on the same two-dimensional plane can be detected. For this reason, if a sound source is located right above the image capturing apparatus 1, the direction of this sound source cannot be detected. For this reason, a description will be given next, with reference to FIGS. 10A and 10B, of the principle of the determination about whether or not the direction in which a sound source is present is the directly-upward direction, performed by the sound source direction detecting unit 2044.

Figure 10A:
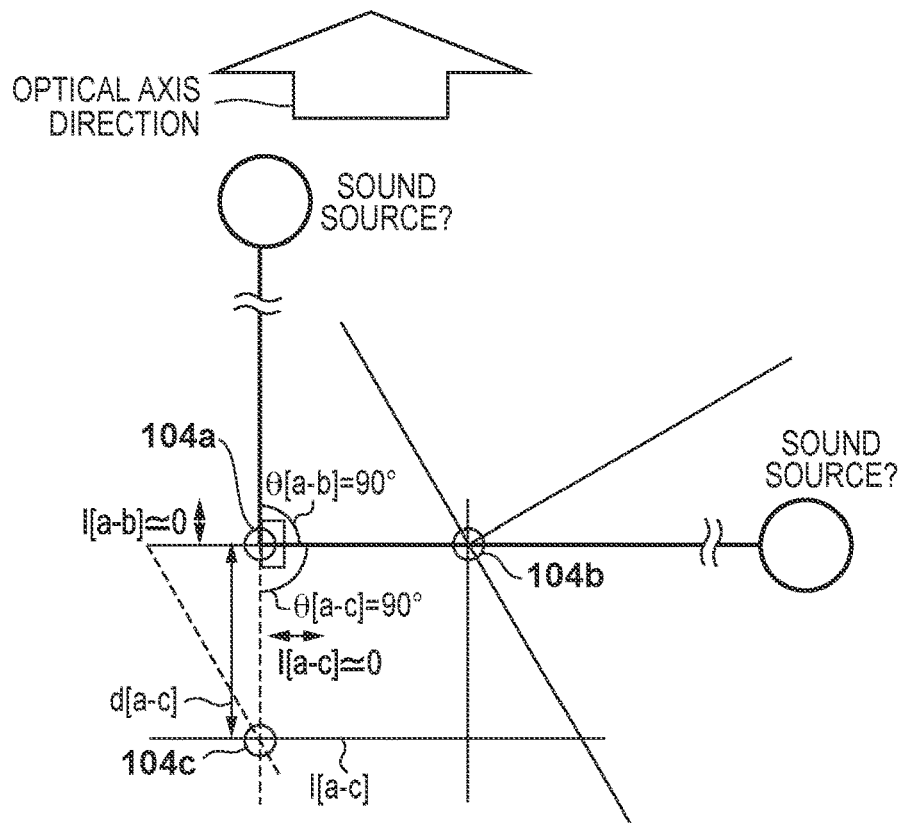
FIGS. 10A and 10B illustrate a detection method in the case where a sound source is present right above the image capturing apparatus.

FIG. 10A illustrates a method performed using three microphones. A description will be given using the microphones 104a, 104b, and 104c. In the case of the arrangement shown in FIG. 3A, a direction perpendicular to the direction in which the microphones 104a and 104b are arranged is the image capturing direction (optical axis direction) of the lens unit 101. The direction in which the microphones 104a and 104b are arranged is the direction of a straight line that connects the center point of the microphone 104a to the center point of the microphone 104b.

A description will now be given of the case where sound is input to the microphones 104a, 104b, and 104c straight from a direction perpendicular to the plane in which the sound input unit 104 is arranged, i.e. from above.

Here, if a sound source is located right above the image capturing apparatus 1, the microphones 104a and 104b can be regarded as being located at the same distance from this sound source. That is to say, there is no time difference in sound that reaches these two microphones 104a and 104b from the sound source. For this reason, it is recognized that the sound source is present in a direction perpendicular to the straight line that connects the microphone 104a to the microphone 104b.

Furthermore, the microphones 104a and 104c can also be regarded as being located at the same distance from the sound source, and therefore, there is no time difference in sound that reaches these two microphones 104a and 104c from the sound source. For this reason, it is recognized that the sound source is present in a direction perpendicular to the straight line that connects the microphone 104a to the microphone 104c.

That is to say, assuming that the absolute value of the time difference between sound detected by the microphone 104a and sound detected by the microphone 104b is $\Delta T1$, and the absolute value of the time difference between sound detected by the microphone 104a and sound detected by the microphone 104c is $\Delta T2$, if the relationship between $\Delta T1$, $\Delta T2$, and a preset, sufficiently small threshold c satisfies the following conditions, it can be determined that the sound source is located right above the image capturing apparatus 1.

Figure 10B:
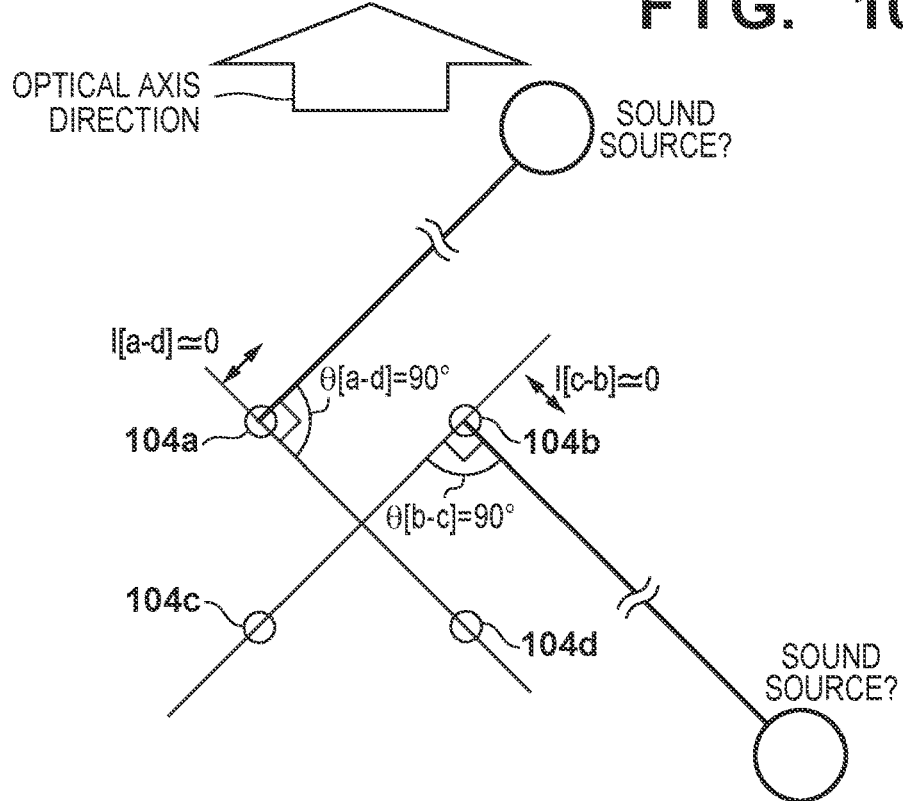

$\Delta T1 < \varepsilon$ and $\Delta T2 < \varepsilon$          Condition:

A description will now be given, with reference to FIG. 10B, of a method of detecting a sound source located right above the image capturing apparatus 1 using the four microphones 104a, 104b, 104c, and 104d. Consideration is given to the pair of the microphones 104a and 104d and the pair of the microphones 104b and 104c, as shown in FIG. 3A.

If a sound source is present right above the image capturing apparatus 1, the microphones 104a and 104d are located at the same distance from this sound source, and accordingly, the absolute value $\Delta T3$ of the time difference between sound detected by the microphone 104a and sound detected by the microphone 104d is zero or a very small value. That is to say, it is recognized that the sound source is present in a direction perpendicular to the straight line that connects the microphone 104a to the microphone 104d.

Furthermore, the microphones 104b and 104c are also located at the same distance from the sound source, and accordingly, the absolute value $\Delta T4$ of the time difference between sound detected by the microphone 104b and sound detected by the microphone 104c is also zero or a very small value. That is to say, it is recognized that the sound source is present in a direction perpendicular to the straight line that connects the microphone 104b to the microphone 104c. Therefore, if the following conditions are satisfied, it can be determined that the sound source is located right above the image capturing apparatus 1.

$\Delta T3 < \varepsilon$ and $\Delta T4 < \varepsilon$          Condition:

As described above, the absolute value of the difference in sound arrival time is obtained for two pairs of microphones out of three or more microphones, and it can be determined that the direction in which a sound source is present is the directly-upward direction if both the two absolute values are smaller than a sufficiently small threshold. Note that, when two pairs are determined, any combinations may be employed as long as the arrangement directions of the two pairs are not parallel to each other.

The first embodiment has been described thus far. According to the above embodiment, it is possible to suppress the case of incorrectly determining an object other than (the face of) a person who has uttered a sound command as an object to be shot. Also, a job intended by the person who has uttered a sound command can be executed.

Furthermore, as described in the above embodiment, power is supplied to the microphones 104a to 104d and the elements that constitute the sound signal processing unit 204 under the control of the central processing unit 201 only when these elements are actually used. Accordingly, power consumption can be suppressed compared with the case where all constituent elements are in an operable state.

Next, specific usage modes will be described based on the description of the above embodiment. As shown in FIGS. 3B to 3E, there are various usage modes of the image capturing apparatus 1 according to this embodiment.

Here, for example, consideration will be given to the case of hanging the image capturing apparatus 1 around the user's neck as shown in FIG. 3C. In this case, it can be readily understood that an unnecessary image will be captured if the image capturing direction (optical axis direction) of the lens unit 101 is oriented toward the user's body. For this reason, it is desirable that the image capturing direction (optical axis direction) of the lens unit 101 is always oriented forward of the user. In this case, the microphones 104c and 104d, of the four microphones, are likely to come into contact with the user, as shown in FIG. 3A. That is to say, these microphones 104c and 104d are likely to collect sound of friction with the user's clothes, which may hinder the sound source direction detection performed by the sound source direction detecting unit 2044 using the four microphones. In this embodiment, in the case of the usage mode in which the image capturing apparatus 1 is hung around the user's neck, the central processing unit 201 interrupts power to the microphones 104c and 104d, and gives the sound source direction detecting unit 2044 an instruction to detect a sound source direction using only the two microphones 104a and 104b. In this case, the problem that two sound source directions are detected when the sound source direction is obtained using only two microphones, as described with reference to FIG. 9A, will not arise. This is because the sound source direction can be regarded as at least being within an area forward of the user. That is to say, the sound source direction detecting unit 2044 detects two sound source directions as a result of calculation due to using only two microphones 104*a* and 104*b*, but detects a sound source direction that is forward of the user as an effective sound source direction. Note that, in the detection of the direction in which the user's body is present, for example, after it is determined that the image capturing apparatus 1 is hung around the neck, the panning operation over 360 degrees (one round) is performed, an appropriate range of the angle (e.g. 180 degrees in FIG. 3C) relative to the direction in which the measured distance is shortest (i.e. the direction toward the user's chest in FIG. 3C) may be determined as the direction in which the user is present. Also, the central processing unit 201 stores the determined direction as a reference direction in the storage unit 206.

Next, consideration will also be given to the case of attaching the image capturing apparatus 1 to the user's shoulder as shown in FIG. 3D. In this case, any one of the four microphones is located at a position close to the user's head, and is likely to come into contact with the user's head or clothes. In this case, one of the four microphones that is close to the user is not used (i.e. is powered off) during sound source direction detection, and a sound source direction is detected using the other three microphones. If the image capturing apparatus 1 is once attached (fixed) to the user's shoulder, the relative direction of the user's head with respect to the image capturing apparatus 1 is unchanged regardless of the user's movement. For this reason, the central processing unit 201 stores this direction as the user's head direction in the storage unit 206. Then, the central processing unit 201 does not use (i.e. interrupts power to) one of the four microphones that is close to the user's head during direction detection, based on the stored direction and the image capturing direction (optical axis direction) of the lens unit 101, and sets the sound source direction detecting unit 2044 to detect a direction using the other three microphones. Note that, in the detection of the direction in which the user's head is present, for example, after it is determined that the image processing apparatus 1 is attached to a shoulder, the panning operation over 360 degrees may be performed to determine an appropriate range of the angle (e.g. 90 degrees) with respect to the direction in which the measured distance is shortest as the direction in which the user is present. Also, the central processing unit 201 stores the direction in which the measured distance is shortest (i.e. user's head direction) as a reference direction in the storage unit 206.

Then, in the case of the usage modes in FIGS. 3B and 3E, the sound source direction detecting unit 2044 may detect a sound source direction using four microphones.

Here, which one of the usage modes in FIGS. 3B to 3E is to be employed is set through the operation unit 205 in the support member 200 by the user. However, if the user sets an automatic detection mode through the operation unit 205, the usage mode is automatically detected by the central processing unit 201. A description will be given below of automatic detection processing performed by the central processing unit 201 in the case where the automatic detection mode is set.

It has already been described that the position detecting unit 212 according to this embodiment has constituent elements, such as a gyroscope sensor, an acceleration sensor, and a GPS sensor, for detecting movement of the image capturing apparatus 1. After the main power source of the image capturing apparatus 1 has turned on and initialization processing in step S101 in FIG. 5A has been performed, basically, the sound source direction detecting unit 2044 detects a sound source direction assuming that the image capturing apparatus 1 is in the state shown in FIG. 3B, that is, in a fixed state.

On the other hand, if the user performs an operation to determine the usage mode while holding the image capturing apparatus 1 after the initialization processing in step S101 in FIG. 5A, naturally, a change that is greater than a threshold is detected by a sensor such as the acceleration sensor or the gyroscope in the position detecting unit 212. Also, it is assumed that the timing at which the user performs this operation is a timing at which the main power source of the image capturing apparatus 1 is turned on. For example, if at least one of the sensors detects a change that is greater than the threshold within a preset period after the initialization processing, the position detecting unit 212 estimates that the user is performing an operation to set up the image capturing apparatus 1, and issues an interrupt signal to the central processing unit 201.

The flowchart shown in FIG. 11 illustrates this interruption processing (processing to detect the set-up position of the image capturing apparatus 1). A description will be given below, with reference to FIG. 11, of processing performed by the central processing unit 201.

Initially, in step S1101, the central processing unit 201 stores, in the storage unit 206, data that is output from the sensors provided in the position detecting unit 212, for a preset period. It is desirable that this storing period is a period sufficient for the user to complete the operations related to the usage mode (e.g. one minute).

As will be described below, after this storing period ends, the central processing unit 201 determines the set-up position of the image capturing apparatus 1 based on the stored data, and determines a method of detecting the sound source direction to be performed by the sound source direction detecting unit 2044. Note that, in the following description, it is assumed that the plane indicated by the x and y axes indicates a plane perpendicular to the rotation axis for the panning operation of the image capturing apparatus 1, and the z axis indicates the axial direction of the rotation axis for the panning operation of the image capturing apparatus 1.

In the case where the user attaches the image capturing apparatus 1 to a shoulder (i.e. the case shown FIG. 3D), the movement amount in any of the x, y, and z-axis directions tends to be significantly larger than that in the cases shown in FIGS. 3B, 3C, and 3E. For this reason, in step S1102, the central processing unit 201 determines whether or not any of the stored accelerations in the x, y, and z-axis directions exceeds a preset threshold. If any of the accelerations exceeds the threshold, the central processing unit 201 estimates that the image capturing apparatus 1 has been attached to the user's shoulder, and in step S1103, the central processing unit 201 sets the sound source direction detecting unit 2044 to detect the sound source direction in accordance with a method (or rule) of detecting the sound source direction using three microphones, namely the microphones other than the microphone located close to the user's head, and ends this processing.

If, in step S1102, the accelerations in all of the x, y, and z-axis directions are smaller than or equal to the threshold, the central processing unit 201 advances the processing to step S1104.

In the case of hanging the image capturing apparatus 1 around the neck, the movement amounts in the x, y, and z-axis directions tend to be smaller than those in the case of putting the image capturing apparatus 1 on a shoulder. In addition, to hang the image capturing apparatus 1 around the neck, an operation to vertically invert the image capturing apparatus 1, as shown in FIG. 3C, is needed. For this reason, in the case of performing the operation to hang the image capturing apparatus 1 around the neck, the angular velocity around a specific axis tends to increase. Also, the amount of rotation around the z axis is small.

In step S1104, the central processing unit 201 detects the angular velocities around the x, y, and z axes and compares these angular velocities with a threshold. Specifically, it is determined as to whether or not the angular velocity along the z axis (yaw) is smaller than or equal to a preset threshold, and whether or not the angular velocity along the x axis or the y axis (roll, pitch) are greater than a preset threshold.

If these conditions are satisfied, the central processing unit 201 estimates that the image capturing apparatus 1 is hung around the user's neck. Then, the central processing unit 201 sets the sound source direction detecting unit 2044 to detect the sound source direction using only two microphones, namely the microphones 104a and 104b, of the four microphones, in accordance with a sound source direction detection method in which a sound source is regarded as being present at a position in the direction opposite to the direction in which the microphones 104c and 104d are arranged, and ends the processing.

On the other hand, if, in step S1104, it is determined that the angular velocity in the yaw direction is greater than the threshold, and it is also determined that the angular velocity in the roll or pitch direction is smaller than or equal to the threshold, then in step S1106, the central processing unit 201 regards the image capturing apparatus 1 as having been fixed to an appropriate position by the user's hand. For this reason, in step S1106, the central processing unit 201 sets the sound source direction detecting unit 2044 to detect the sound source direction in accordance with the sound source direction detection method using four microphones, and ends this processing.

In a fixed state, the image capturing apparatus 1 hardly moves unlike the case of being put on a shoulder or hung around the neck. For this reason, if none of the aforementioned cases applies, it can be determined that the image capturing apparatus 1 fixed.

Note that, in the case where the user has ended an operation to position the image capturing apparatus 1, the central processing unit 201 may be notified of the end of this operation by inputting an instruction indicating the end of the operation from the operation unit 205. Also, the set-up position may be set from a PC or a mobile terminal via the wireless communication unit 214.

Figure 12:
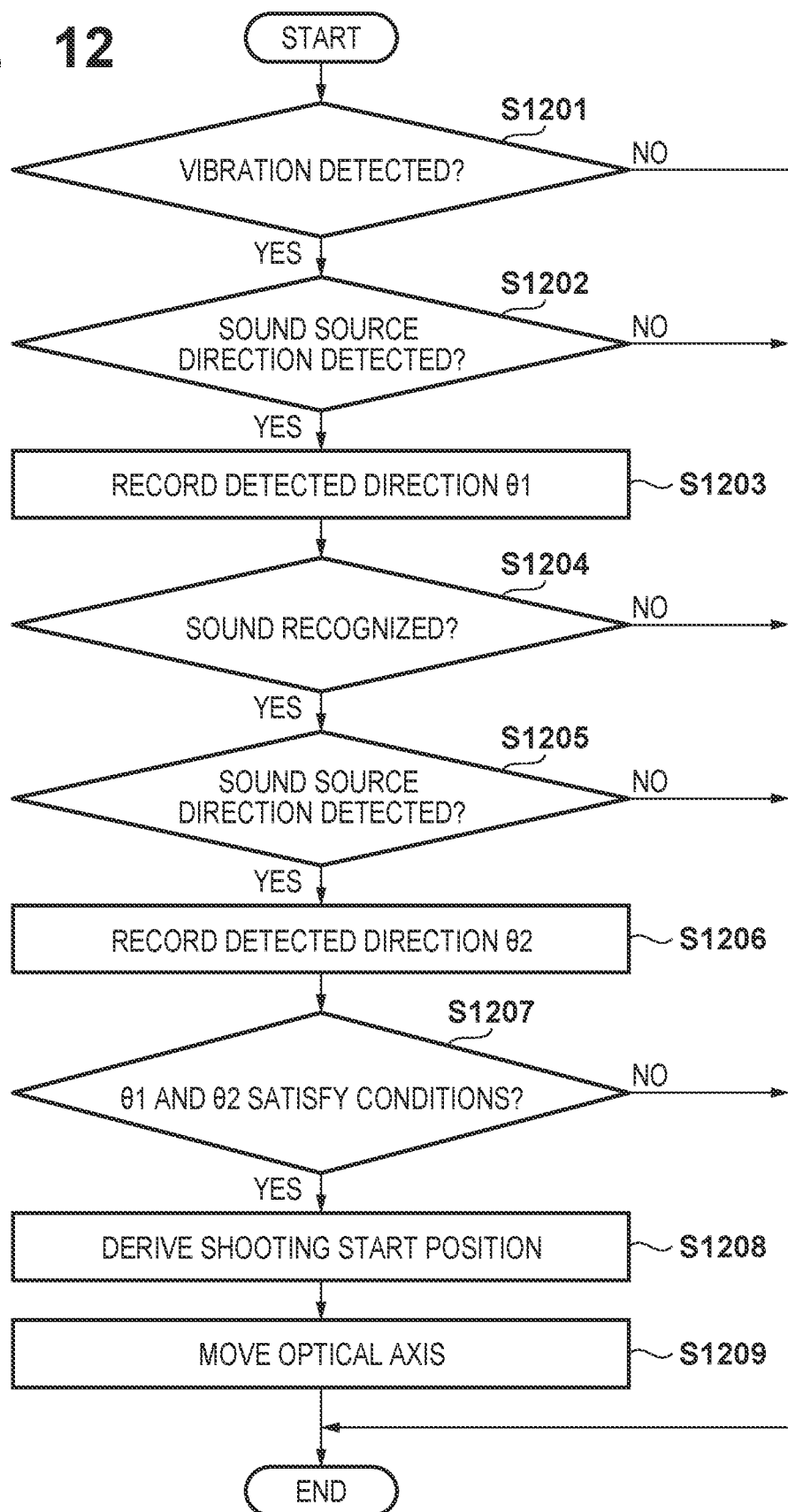
FIG. 12 is a flowchart illustrating front determination processing according to the first embodiment.

Next, a description will be given, in accordance with the flowchart in FIG. 12, of front determination processing, which is performed before transitioning to the intermittent front image capturing mode (step S218 in FIG. 6) according to the embodiment. This processing is performed after the processing to detect the set-up position of the image capturing apparatus 1 described with reference to FIG. 11.

In the case of transitioning to the intermittent front image capturing mode, the central processing unit 201 captures a still image of the front side of the person who is wearing the image capturing apparatus 1 from now on, regardless of a detected sound source direction. The central processing unit 201 repeatedly shooting still images at an interval of 10 seconds, for example. For this purpose, the central processing unit 201 needs to determine the direction that is to serve as the front side of the person who is wearing the image capturing apparatus 1 so as to match the image capturing direction (optical axis direction) of the movable image capturing unit 100 to the direction serving as the front side of the person who is wearing the image capturing apparatus 1. The user who is wearing the image capturing apparatus 1 according to the embodiment performs an operation to knock the image capturing apparatus 1 at a position corresponding to the direction serving as the front side of the user, and utters predetermined voice. The central processing unit 201 in the image capturing apparatus 1 determines the front direction for the user based on a vibration and sound caused by the knocking operation, as well as the uttered voice, and performs processing to match the image capturing direction (optical axis direction) of the movable image capturing unit 100 to the determined direction. This processing is the front determination processing performed by the central processing unit 201.

Although the case of transitioning to the intermittent front image capturing mode has been described as an example here, similar processing may also be performed in the case of transitioning to a front still image capturing mode of shooting, only once, a still image of the front side of the person who is wearing the image capturing apparatus 1, or a front moving image capturing mode of shooting a moving image of the front side for the person who is wearing the image capturing apparatus 1. For example, a configuration may also be employed in which the image capturing apparatus 1 can distinguish between sound commands such as "shoot a still image of the front side" "intermittently shoot an image of the front side", and "shoot a moving image of the front side".

Initially, in step S1201, the central processing unit 201 detects a vibration of the image capturing apparatus 1. Here, the position detecting unit 212 detects a weak vibration occurring due to the housing of the image capturing apparatus 1 being knocked. If the intensity of the vibration detected by the position detecting unit 212 is within a preset threshold range, the central processing unit 201 determines that the detected vibration is a vibration occurring due to the image capturing apparatus 1 being knocked, that is, a vibration occurring due to a knocking operation. Although the position detecting unit 212 detects a vibration here, a sensor for detecting vibration may be separately prepared to detect a vibration.

In step S1202, the central processing unit 201 performs processing to detect the direction in which the knocking sound occurred when the housing of the image capturing apparatus 1 was knocked, in parallel to the processing in step S1201. Specifically, if the sound pressure level of the knocking sound detected by the sound pressure level detecting unit 2041 exceeds a threshold, the sound source direction detecting unit 2044 detects the direction in which the knocking sound occurred. Since it is assumed that the knocking sound occurs on the surface of the image capturing apparatus 1, the knocking sound occurs very closely to the microphones 104a to 104d. In this embodiment, the sound source direction relative to the microphone 104a is detected.

In step S1203, the central processing unit 201 records the direction in which the knocking sound occurred as θ1 in the buffer memory 2044a.

Subsequently, in step S1204, the central processing unit 201 causes the sound command recognition unit 2043 to detect utterance of a preset specific sound command. In step S1205, the central processing unit 201 causes the sound source direction detecting unit 2044 to detect the direction of the utterance source of the sound command detected in step S1204. In step S1206, the central processing unit 201 records the direction in which the sound command was uttered as θ2 in the buffer memory 2044a.

In step S1207, the central processing unit 201 determines whether or not θ1 and θ2 satisfy preset conditions. These conditions will be described later. If it is determined that the conditions are satisfied, then in step S1208, the central processing unit 201 derives the direction that indicates the front side of the person who is wearing the image capturing apparatus 1. In step S1209, the central processing unit 201 controls the rotation control unit 213 to match the image capturing direction (optical axis direction) of the movable image capturing unit 100 to the derived direction. If it is determined that the conditions are not satisfied, the central processing unit 201 ends the processing.

The preset conditions will now be described. For example, in the case where the image capturing apparatus 1 is hung around the neck, it is derived that the direction θ1 in which the knocking sound occurred is opposite to the direction θ2 in which sound was recognized. In this case, the central processing unit 201 determines, as the direction serving as the front side of the person who is wearing the image capturing apparatus 1, the direction of a straight line that connects the center of the housing of the image capturing apparatus 1 to the point at which the direction θ1 in which the knocking sound occurred intersects the surface of the housing of the image capturing apparatus 1.

In the case where the image capturing apparatus 1 is put on a shoulder, for example, it is derived that the direction θ1 in which the knocking sound occurred is shifted from the direction θ2 in which sound was recognized by 90°. In this case, the central processing unit 201 determines, as the direction serving as the front side of the person who is wearing the image capturing apparatus 1, the direction of a straight line that connects the center of the housing of the image capturing apparatus 1 to the point at which the direction θ1 in which the knocking sound occurred intersects the surface of the housing of the image capturing apparatus 1.

In the case where the image capturing apparatus 1 is fixed, for example, it is derived that the direction θ1 in which the knocking sound occurred is the same as the direction θ2 in which sound was recognized. In this case, the central processing unit 201 determines, as the direction serving as the front side of the person who is wearing the image capturing apparatus 1, the direction of a straight line that connects the center of the housing of the image capturing apparatus 1 to the point at which the direction θ1 in which the knocking sound occurred intersects the surface of the housing of the image capturing apparatus 1.

Note that, if none of the above conditions is satisfied, the central processing unit 201 determines that the determination about the set-up position of the image capturing apparatus 1 was incorrect, or that the knocking position was incorrect. In this case, the central processing unit 201 may cause processing to set the set-up position and the operation to knock the image capturing apparatus 1 to be performed.

FIGS. 13A to 15C are conceptual diagram illustrating examples of processing performed by the central processing unit 201 to detect a shooting start position at respective attachment positions.

A description will be given, with reference to FIGS. 13A to 13C, of the front determination in the case of hanging the image capturing apparatus 1 around the neck as shown in FIG. 3C.

Figure 13A:
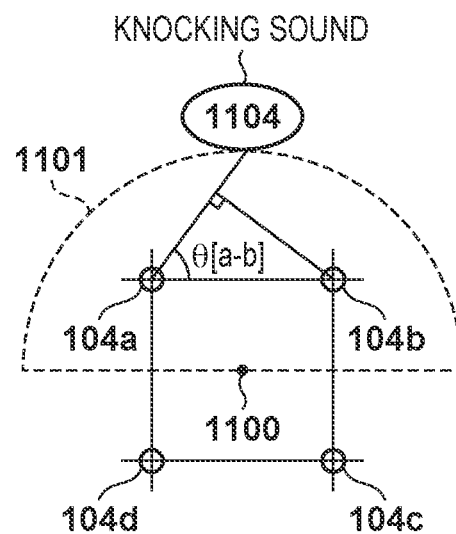
FIGS. 13A to 13C illustrate front determination processing according to the first embodiment.
Figure 13B:
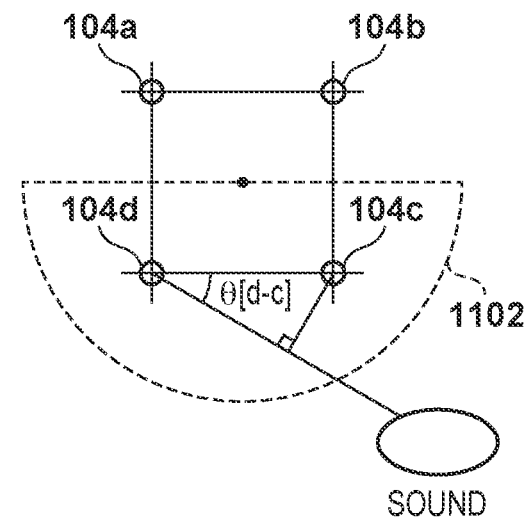
Figure 13C:
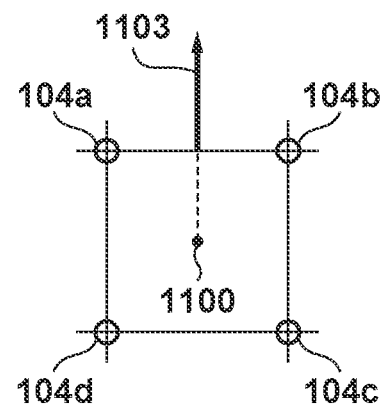

Initially, as shown in FIG. 13A, upon detecting the direction θ1 (θ[a–b]) in which knocking sound input to the microphone 104a occurred, the central processing unit 201 sets a direction range 1101, which is a hemisphere indicating the surface of the housing of the image capturing apparatus 1 on the basis of the direction θ1 in which the knocking sound occurred. Then, the central processing unit 201 estimates, as a knocking position 1104, the position of an intersection point between the line extending from the microphone 104a in the direction θ1 and the direction range 1101. If the direction θ2 (θ[d–c]) in which a specific sound command was detected is detected in a direction range 1102 that is opposite to the direction range 1101, as shown in FIG. 13B, the central processing unit 201 determines that the direction 1103 in which the center 1100 of the image capturing apparatus 1 is connected to the estimated knocking position 1104 as the direction serving as the front side of the person who is wearing the image processing apparatus 1, as shown in FIG. 13C.

Next, a description will be given, with reference to FIGS. 14A to 14C, the front determination in the case of putting the image capturing apparatus 1 on a shoulder as shown in FIG. 3D.

Figure 14A:
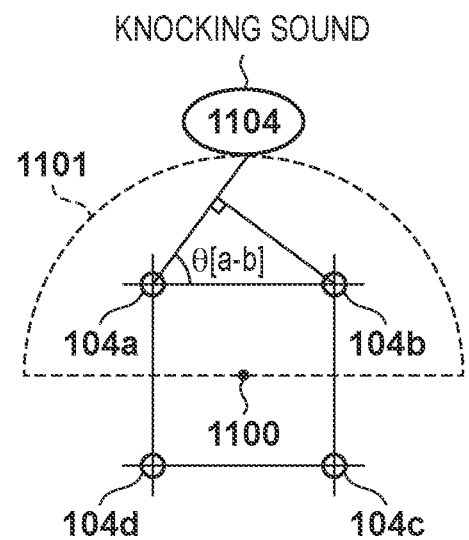
FIGS. 14A to 14C illustrate front determination processing according to the first embodiment.
Figure 14B:
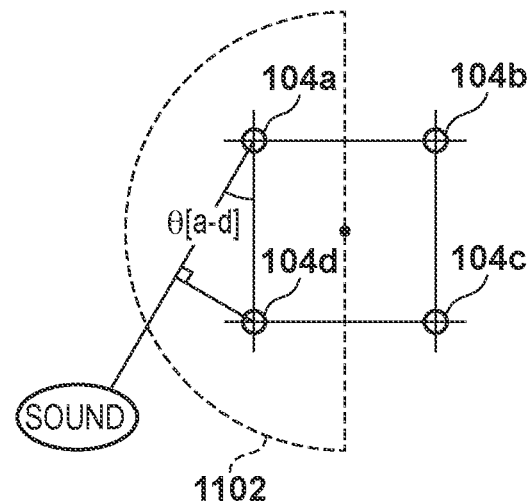
Figure 14C:
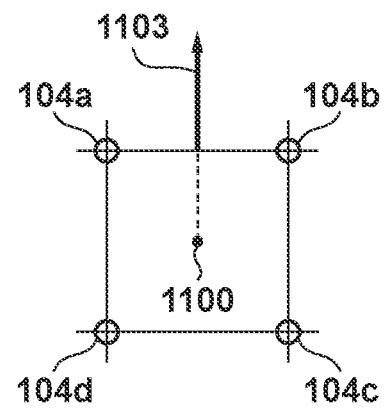

As shown in FIG. 14A, upon detecting the direction θ1 in which knocking sound input to the microphone 104a occurred, the central processing unit 201 sets a direction range 1101, which is a hemisphere indicating the surface of the housing of the image capturing apparatus 1 on the basis of the direction θ1 (θ[a–b]) in which the knocking sound occurred. Then, the central processing unit 201 estimates, as a knocking position 1104, the position of an intersection point between the line extending from the microphone 104a in the direction θ1 and the direction range 1101. If the direction θ2 (θ[a–d]) in which a specific command was detected is detected in a direction range 1102 that is opposite to the range 1101, as shown in FIG. 14B, the central processing unit 201 determines that the direction 1103 in which the center 1100 of the image capturing apparatus 1 is connected to the estimated knocking position 1104 as the direction serving as the front side of the person who is wearing the image processing apparatus 1, as shown in FIG. 14C.

Next, a description will be given, with reference to FIGS. 15A to 15C, of the front determination in the case of fixing the image capturing apparatus 1 as shown in FIG. 3B.

Figure 15A:
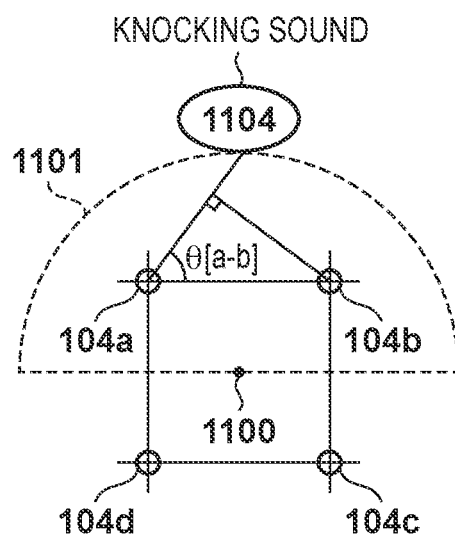
FIGS. 15A to 15C illustrate front determination processing according to the first embodiment.
Figure 15B:
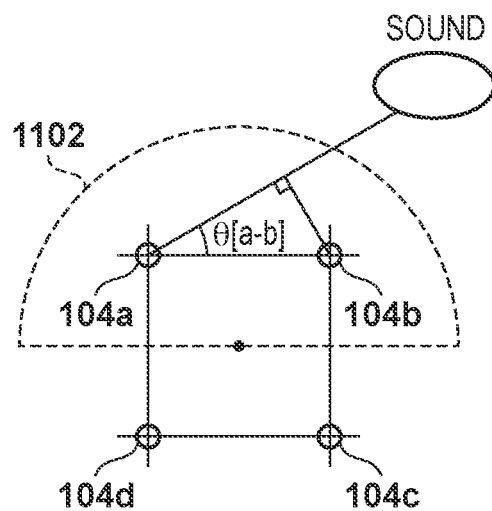
Figure 15C:
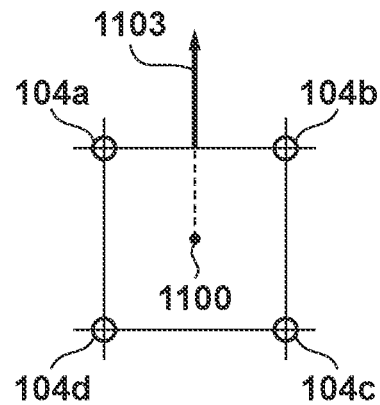

Upon detecting the direction θ1 (θ[a–b]) in which knocking sound input to the microphone 104a occurred, as shown in FIG. 15A, the central processing unit 201 sets a direction range 1101, which is a hemisphere indicating the surface of the housing of the image capturing apparatus 1 on the basis of the direction θ1 in which the knocking sound occurred. If the direction θ2 (θ[a–b]) in which a specific message input to the microphone 104a was detected is within a direction range 1102 that is the same as the direction range 1101, as shown in FIG. 15B, the central processing unit 201 determines that the direction 1103 in which the center 1100 of the image capturing apparatus 1 is connected to the estimated knocking position 1104 as the direction serving as the front side of the user of the image processing apparatus 1, as shown in FIG. 15C.

As described above, according to this embodiment, the image capturing direction of the image capturing apparatus 1 can be oriented to a desired direction for the user. Note that the above embodiment has described an example in which a sound command indicating intermittent front shooting is uttered. Meanwhile, if, in the case where a command for fixing the image capturing direction forward was uttered, the above-described processing in FIG. 12 is performed, and the still image shooting command or the moving image shooting command is thereafter uttered, a still image or a moving image may be shot and recorded while keeping this direction. Also, a special sound command for returning to a mode of orienting the image capturing direction of the movable image capturing unit 100 to the direction in which an original sound source is present may also be provided, and a switch for returning to this mode may also be prepared. A configuration may also be employed in which the image capturing apparatus 1 transitions from a standby state to a starting state in accordance with the position detecting unit 212 having detected a vibration, rather than starting upon recognizing the start command that is given by sound, and may perform processing in step S1201 and subsequent steps in FIG. 12.

Second Embodiment

In the first embodiment, the front side of the user is determined by uttering a sound command for performing the intermittent front shooting, but the determination about the set-up position of the image capturing apparatus 1 and the determination about the front side of the user (the person who is wearing the image capturing apparatus) may be performed at the same time during an initial period after the power source of the image capturing apparatus 1 is turned on. As a result, if a sound command for giving an intermittent front shooting instruction is uttered, the central processing unit 201 immediately performs control to orient the image capturing direction of the image capturing apparatus 1 to the initially-set front side, and intermittent shooting can then be started.

It is assumed here that the apparatus configuration is the same as that in the first embodiment, and differences will be described below.

FIG. 16 is a flowchart illustrating processing performed by the central processing unit 201 according to the second embodiment. FIG. 16 illustrates processing performed immediately after step S111 in FIG. 5A (in the case where the start command has been recognized). For this reason, see the first embodiment for processing performed before step S1401.

In step S1401, the central processing unit 201 determines whether or not the image capturing apparatus 1 is attached to the body of the photographer. The image capturing apparatus 1 has the position detecting unit 212, which includes a gyroscope, an acceleration sensor, and the like, for detecting movement of the image capturing apparatus 1. If an output value of the gyroscope or the acceleration sensor is greater than a predetermined value, it is determined that the image capturing apparatus 1 is in a state in which it is attached to the body of the photographer, and the processing proceeds to step S1403. If the output values of the gyroscope and the acceleration sensor are smaller than a preset value, it is determined that the image capturing apparatus 1 is not attached to the body of the photographer but is set up in a place other than on the photographer, and the processing proceeds to step S1411.

If the processing proceeds to step S1411, the central processing unit 201 determines that the image capturing apparatus 1 is in a fixed state, and does not specifically define the direction serving as the front side.

If the processing proceeds to step S1403, the central processing unit 201 rotates (pans) the movable image capturing unit 100 over 360° in the horizontal direction to obtain an image by shooting the surroundings of the image capturing apparatus 1 by 360°, and advances the processing to step S1404. At this time, if an image of the surroundings over 360° while fixing the in-focus distance of the movable image capturing unit 100 to approximately 30 cm, for example, the photographer's body, which is present at a distance shorter than 30 cm in many cases, cannot be brought into focus. For this reason, the central processing unit 201 can readily obtain a low-contrast image in an unshootable area. Thus, the central processing unit 201 can readily distinguish between a shootable area in which contrast is high and an unshootable area in which contrast is low. The central processing unit 201 distinguishes between a shootable area in which contrast is greater than or equal to a preset threshold and an unshootable area in which contrast is smaller than the threshold, for example. However, the central processing unit 201 may distinguish between a shootable area that can be brought into focus and an unshootable area that cannot be brought into focus. For example, the central processing unit 201 may determine the focusing state by obtaining, from the movable image capturing unit 100, information indicating whether or not an object has been brought into focus, information indicating an in-focus position, or the like, as information indicating the result of automatic focus control.

Distinction between the shootable area and the unshootable area may be performed using a phase-difference AF (Auto Focus) sensor, as well as the above-described determination based on the contrast. The phase-difference AF sensor splits the light that is incident from the lens into two light beams, guide these light beams to dedicated sensors, and thus can determine the direction and the amount of focus based on the space between two formed images. Since the distance to the object can be understood, distinction can be made while assuming that an area in which an object is farther than 30 cm is the shootable area, and that an area in which an object is closer than 30 cm is the unshootable area, for example. As described above, any method other than the contrast method and the phase-difference AF method may also be used as long as distinction can be made between the shootable area and the unshootable area, and the method is not particularly limited.

In step S1404, the central processing unit 201 analyzes the image obtained by shooting the surroundings over 360° in the horizontal direction in step S1403 to detect the shootable area, and advances the processing to step S1405.

In step S1405, the central processing unit 201 determines whether or not the image capturing apparatus 1 is in a state in which it is hung around the neck.

Figure 17:
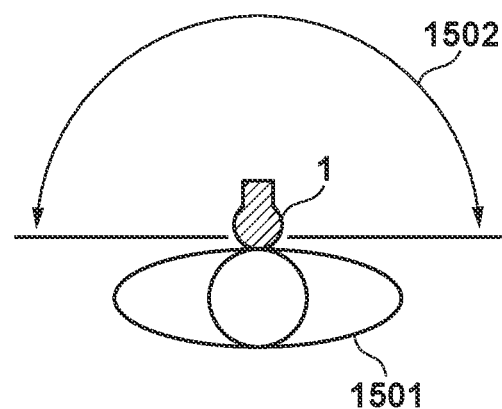
FIG. 17 illustrates a front area when the image capturing apparatus is hung around the neck, according to the second embodiment.

FIG. 17 is a schematic diagram illustrating a state where the photographer hangs the image capturing apparatus 1 around his neck. When a photographer 1501 is hanging the image capturing apparatus 1 around the neck, a first shootable area 1502 is approximately 180°, for example. Also, the direction of voice uttered by the photographer 1501 when starting the image capturing apparatus 1 is almost right above the image capturing apparatus 1. Since the sound from almost right above the image capturing apparatus 1 arrives at the microphones 104a, 104b, 104c, and 104d at the same time, it is determined that there is no information regarding the sound source direction even if sound source direction detection is performed using a phase difference.

Thus, if the first shootable area 1502 is approximately 180° and no result is obtained after the sound source direction detection, the central processing unit 201 determines that the photographer 1501 is wearing the image capturing apparatus 1 while hanging the image capturing apparatus 1 around his neck. If, for example, the shootable area 1502 is 180°±45°, the central processing unit 201 according to the second embodiment determines that the photographer 1501 is wearing the image capturing apparatus 1 while hanging the image capturing apparatus 1 around his neck, and advances the processing to step S1406.

In step S1406, the central processing unit 201 defines the front direction based on the shootable area and sound source direction information. As a result of processing in step S1405, it can be considered that the center of the shootable area 1502 matches the front side intended by the photographer 1501, and thus, the central processing unit 201 defines this direction as the front direction, and stores this direction in the storage unit 206.

In step S1407, the central processing unit 201 determines whether or not the image capturing apparatus 1 is in a state in which it is put on the right shoulder.

Figure 18A:
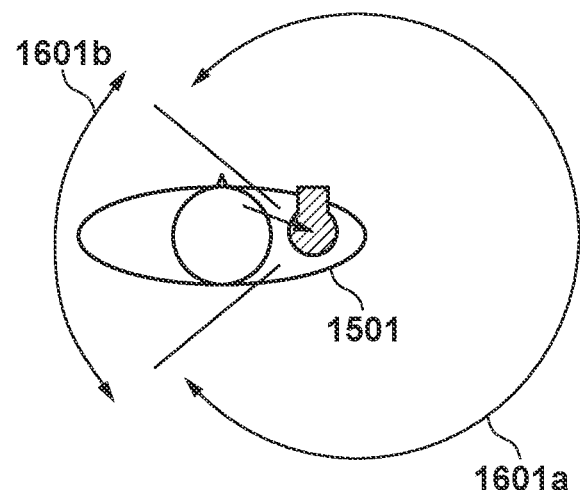
FIGS. 18A and 18B illustrate front areas when the image capturing apparatus is hung on a shoulder, according to the second embodiment.

FIG. 18A is a schematic diagram showing a state where the photographer is wearing the image capturing apparatus while placing the image capturing apparatus on the right shoulder. When the photographer 1501 is wearing the image capturing apparatus 1 in a state in which it is put on the right shoulder, a shootable area 1601a is approximately 315°, for example. The direction of voice uttered by the photographer 1501 when starting the image capturing apparatus 1 is a direction shifted clockwise from the center position of an unshootable area 1601b by a predetermined amount or more.

Thus, when the shootable area 1601a is approximately 315°, and the result of sound source direction detection is a direction shifted clockwise from the center of the unshootable area 1601b, the central processing unit 201 determines that the photographer 1501 is wearing the image capturing apparatus 1 in a state in which it is put on the right shoulder. In the second embodiment, it is determined that the photographer 1501 is wearing the image processing apparatus 1 in a state in which it is put on the right shoulder if, for example, the shootable area 1601a is 315°±45° and the direction in which voice was collected is a direction shifted clockwise from the center of the unshootable area 1601b, and the processing proceeds to step S1408.

In step S1408, the central processing unit 201 defines the front direction based on the unshootable area and sound source direction information. If information indicating that the shootable area 1601a is 315° has been obtained as a result of processing in step S1407, the unshootable area is the remaining angle, namely 45°. If it is considered based on FIG. 18A that the unshootable area corresponds to the head of the photographer 1501, the direction shifted clockwise by 90° from the center of this unshootable area is considered as the front direction intended by the photographer 1501, and thus, this direction is defined as the front side and is stored in the storage unit 206.

In step S1409, the central processing unit 201 determines whether or not the image capturing apparatus 1 is in a state in which it is put on the left shoulder.

Figure 18B:
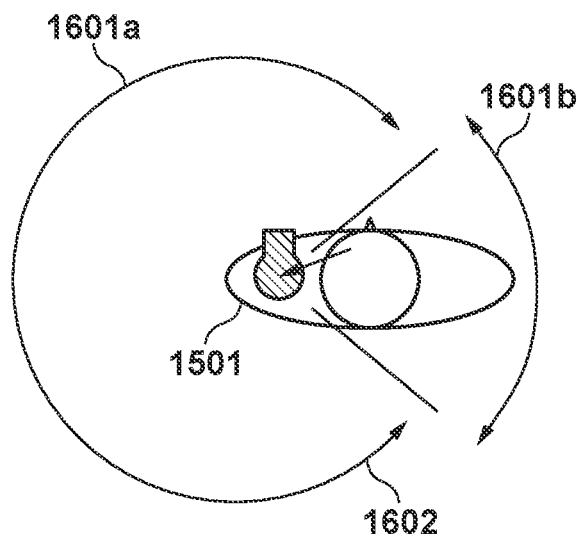

FIG. 18B is a schematic diagram showing a state where the photographer is wearing the image capturing apparatus while placing the image capturing apparatus on the left shoulder. When the photographer 1501 is wearing the image capturing apparatus 1 in a state in which it is put on the left shoulder, the shootable area 1601a is approximately 315°, for example. Also, the direction of voice uttered by the photographer 1501 when starting the image capturing apparatus 1 is a direction shifted counterclockwise from the center of the unshootable area 1601b, and thus, the central processing unit 201 determines that the photographer 1501 is wearing the image capturing apparatus 1 in a state in which it is put on the left shoulder. In the second embodiment, it is determined that the photographer 1501 is wearing the image processing apparatus 1 in a state in which it is put on the left shoulder when the shootable area 1601a is 315°±45° and the direction in which voice was collected is a direction shifted counterclockwise from the center of the unshootable area 1601b, and the processing proceeds to step S1410.

In step S1410, the central processing unit 201 defines the front direction based on the unshootable area and the sound source direction information. If information indicating that the shootable area 1601a is 315° has been obtained in processing in step S1409, the unshootable area is the remaining angle, namely 45°. If it is considered based on FIG. 18B that the unshootable area corresponds to the head of the photographer 1501, the direction shifted counterclockwise by 90° from the center of this unshootable area is considered as the front direction intended by the photographer 1501 and thus, this direction is defined as the front side and is stored in the storage unit 206.

As a result of the above, according to the second embodiment, the set-up position of the image capturing apparatus and the front direction for the user can be determined only by performing an operation to position the image capturing apparatus while uttering the start command that is given by sound. Accordingly, if a sound command for giving an intermittent front shooting instruction is recognized, the central processing unit 201 can perform control to immediately match the image capturing direction of the movable image capturing unit 100 to the direction of the recognized sound command to prepare image capturing.

Note that, if the processing proceeds to step S1411, or if it cannot be determined in step S1409 that the image capturing apparatus 1 is put on the left shoulder, processing corresponding to various sound commands is to be performed with the front direction undefined. For this reason, if the user utters a sound command for which the direction serving as the front side is needed, and the front side is undefined (i.e. information indicating the direction serving as the front side is not stored in the storage unit 206), processing that has been described in the first embodiment and shown as an example in FIG. 12 may also be performed.

Third Embodiment

In the above-described first embodiment, the user of the image capturing apparatus 1 performs the operation to knock at a position that indicates a desired direction in order to orient the image capturing direction (optical axis direction) of the image capturing apparatus 1 to the desired direction for the user (the front side in the first embodiment). That is to say, to orient the image capturing apparatus 1 to a direction other than the direction toward the user, the user needs to be within an area in which the user can reach the image capturing apparatus 1. The third embodiment will describe, with reference to FIGS. 19A to 19E and 20, an example in which the user can also orient the image capturing direction 1 to a direction other than the direction toward the user even in the case where the distance between the user who instructs the image capturing direction and the image capturing apparatus 1 is more than a reachable distance. Note that the apparatus configuration is the same as that in the first embodiment, and a description there of is omitted.

FIGS. 19A to 19E are diagrams showing a method of setting the image capturing direction of the image capturing apparatus according to the third embodiment.

In FIG. 19A, a user 1701 utters a sound command indicating a shooting direction setting. The central processing unit 201 in the image capturing apparatus 1 recognizes this sound command and performs processing to detect the sound source direction, as shown in FIG. 19B.

First, after recognizing the sound command indicating the shooting direction setting and performing processing to detect the sound source direction, the central processing unit 201 controls the rotation control unit 213 to match the image capturing direction (optical axis direction) of the movable image capturing unit 100 to the detected sound source direction, as shown in FIG. 19C, and detect the user 1701.

After recognizing the presence of the user 1701 in the captured image, the central processing unit 201 detects the direction in which the face of the user 1701 is oriented, and registers (stores) information indicating the detected direction in the storage unit 206. The direction of the face mentioned here is information that expresses the direction in which the user 1701 is looking, and is the angle of the entire face that is derived from the positional relationship between parts of the face. Otherwise, a configuration may be employed in which the direction of the line of sight derived from the positional relationship between parts around eyeballs, such as the inner corner of an eye and an iris, is regarded as the direction of the face. The direction of the face need only be information indicating the direction in which the operator is looking, and various derivation methods are applicable.

Figure 19D:
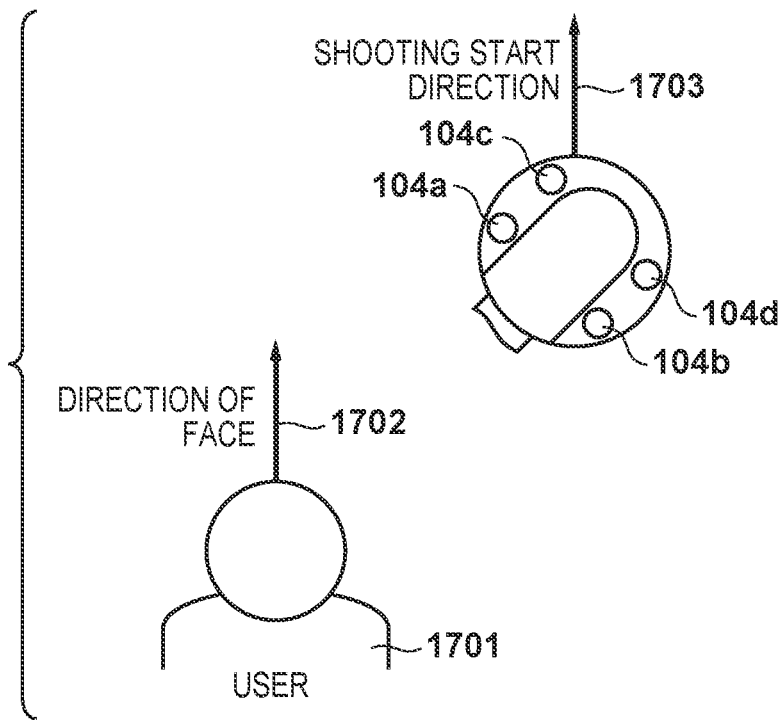
Figure 19E:
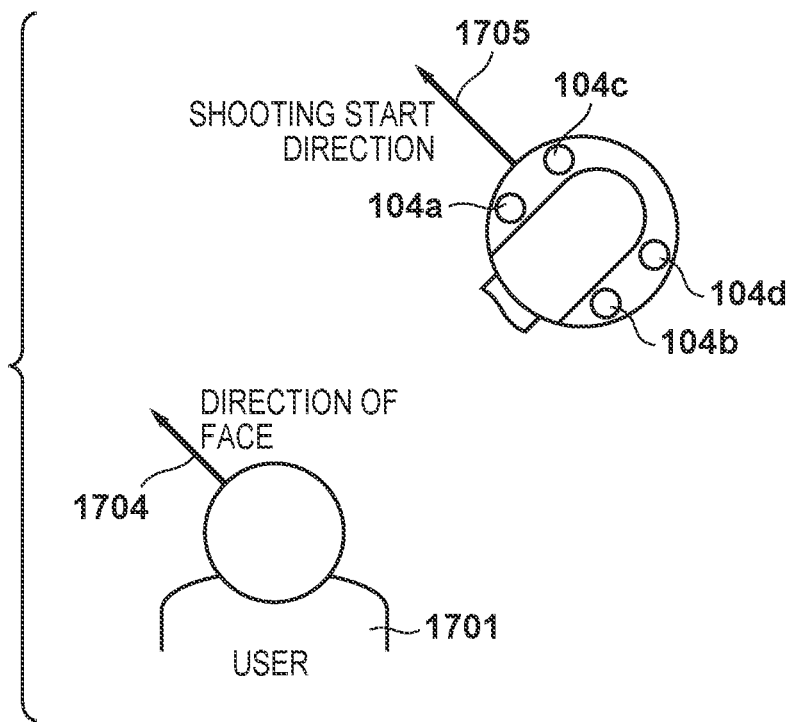

For example, the face of the user 1701 is oriented toward the front side 1702 in the case of FIG. 19D, the central processing unit 201 registers a direction 1703 parallel to the front side 1702 in the storage unit 206. Also, if the face of the user 1701 is oriented to an obliquely left front side 1704 as shown in FIG. 19E, the central processing unit 201 registers a direction 1705 parallel to the obliquely left front side 1704 in the storage unit 206.

It is assumed below that the sound command recognition unit 2043 has recognized a sound command for capturing an image in the registered direction (e.g. a sound command for intermittently capturing an image in the registered direction). In this case, the central processing unit 201 shoots and records an image while orienting the image capturing direction of the movable image capturing unit 100 to the registered direction, rather than orienting the image capturing direction of the movable image capturing unit 100 to the sound source direction of this sound command. Using this, it is possible to not only perform the already-described intermittent front shooting, but also perform intermittent shooting and shooting and recording of a moving image in a desired direction for the user.

Note that a sound command for deleting the registered direction may also be prepared, and if a sound command indicating a shooting direction setting is recognized again, information indicating the direction stored beforehand is overwritten.

Figure 20:
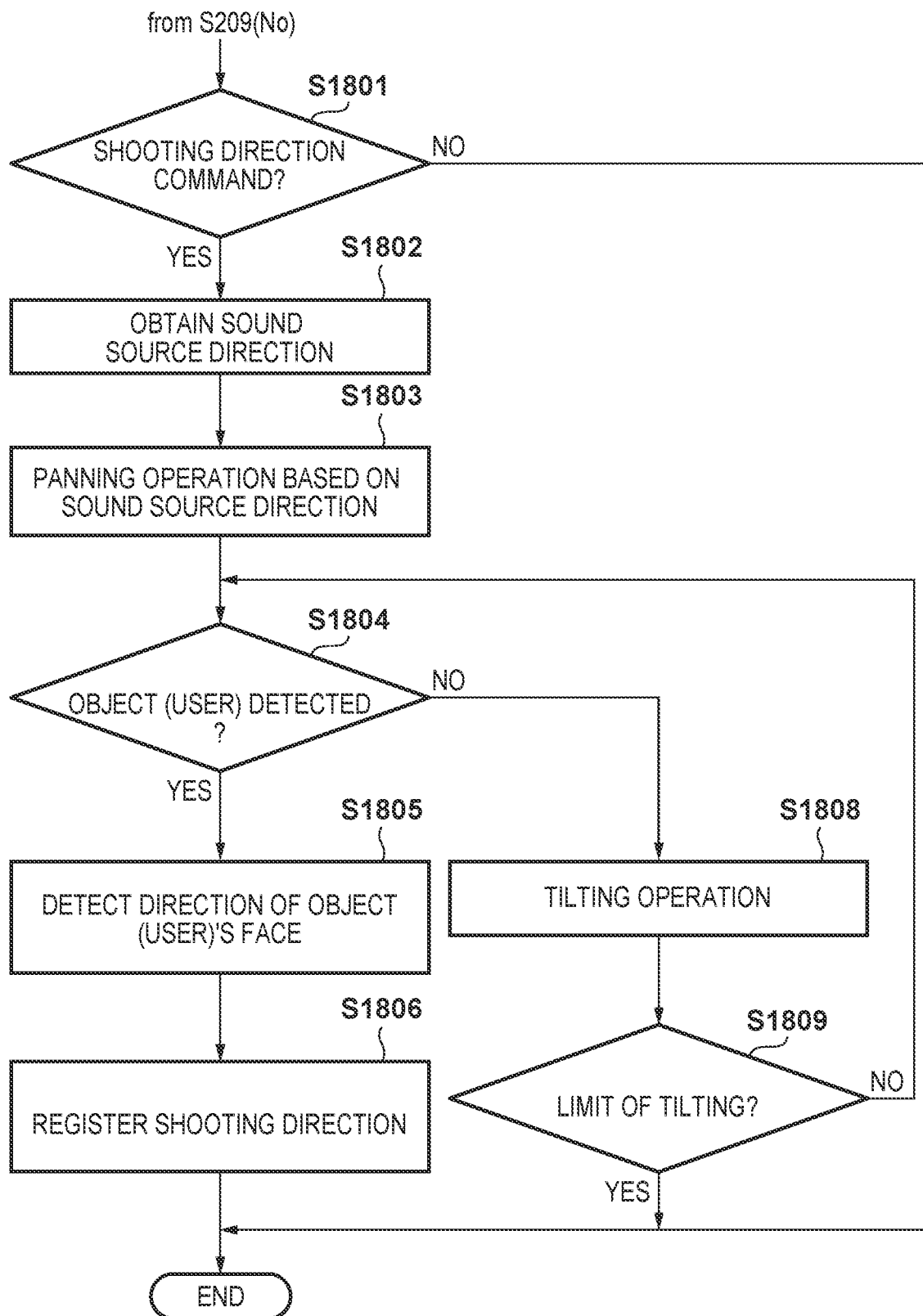
FIG. 20 is a flowchart illustrating shooting direction registration processing according to the third embodiment.

Next, a description will be given of processing to set the shooting direction according to the third embodiment, in accordance with the flowchart in FIG. 20. It should be understood that processing shown in FIG. 20 is processing to be performed immediately after it is determined in step S209 in FIG. 6 that the sound command is not the intermittent front shooting command.

In step S1801, the central processing unit 201 determines whether or not the sound command recognized by the sound command recognition unit 2043 is a shooting direction setting command. If it is determined that the recognized sound command is the shooting direction setting command, the central processing unit 201 advances the processing to step S1802. In step S1802, the central processing unit 201 obtains the direction of a sound source (user) of the sound command from the sound source direction detecting unit 2044. In step S1803, the central processing unit 201 controls the rotation control unit 213 to perform the panning operation in order to match the image capturing direction of the movable image capturing unit 100 to the obtained sound source direction. In step S1804, the central processing unit 201 determines whether or not an object has been detected. If no object has been detected, the central processing unit 201 loops processing steps S1808, S1809, and S1804, and performs processing to change the tilt angle by a predetermined value at a time until an object is detected in step S1804 or the tilt angle reaches its upper limit in step S1809.

If an object is detected, the central processing unit 201 advances the processing from step S1804 to step S1805. In step S1805, the central processing unit 201 analyzes the captured image and performs processing to detect the direction of the object's face. In step S1806, the central processing unit 201 registers the detected direction of the object's face in the storage unit 206, and returns the processing to step S151 (FIG. 5B).

As described above, according to the third embodiment, it is possible to register a desired direction for the user to the image capturing apparatus 1 and capture an image in the registered direction in a non-contact state.

Although preferable embodiments of the present invention have been described thus far, the present invention is not limited to these embodiments, and may be modified and altered in various manners within the scope of the gist of the present invention. In the examples of the present invention, a digital camera has been taken as an example of the image capturing apparatus, but the present invention can be applied to various apparatuses that have shooting means and communication means, such as a video camera and a smartphone.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-071918, filed Apr. 3, 2018, which is hereby incorporated by reference herein in its entirety.

What is claimed is:

1. An image capturing apparatus comprising:
an image capturing unit;
a rotation drive unit; and
one or more processors;
wherein the one or more processors performs control such that the rotation drive unit moves the image capturing unit;
wherein the one or more processors performs control such that the image capturing unit captures a video or an image,
wherein the one or more processors perform control such that the rotation drive unit moves the image capturing direction of the image capturing unit to a predetermined direction,
wherein the one or more processors determine the predetermined direction based on a person captured by the image capturing unit, and
wherein the predetermined direction is a direction in which the person's face is oriented that is captured by the image capturing apparatus.

2. The apparatus according to claim 1, further comprising:
a sound input unit including a plurality of microphones; and
a sound signal processing unit configured to recognize a sound command indicated by sound data input from the sound input unit and to detect a sound source direction based on sound data input from the sound input unit;
wherein the one or more processors perform control such that the rotation drive unit moves the image capturing direction of the image capturing unit to a predetermine direction in accordance with the recognized sound command, and
wherein, in a case where a preset sound command is recognized by the sound signal processing unit, the one or more processors determine the predetermined direction based on the person captured by the image capturing unit.

3. The apparatus according to claim 2,
wherein, in a case where the preset sound command is recognized by the sound signal processing unit, the one or more processors determine which of a plurality of preset set-up positions the image capturing apparatus is set up, based on a plurality of images captured while changing the image capturing direction of the image capturing unit.

4. The apparatus according to claim 3,
wherein the set-up positions include a person's shoulder, hanging around a person's neck, and setup on a fixed material.

5. The apparatus according to claim 2,
wherein, in a case where a first sound command is recognized by the sound signal processing unit, the one or more processors determine a direction in which a person's face is oriented that is obtained by performing control such that the rotation unit moves the image capturing direction of the image capturing unit to the sound source direction detected by the sound signal processing unit,
wherein the one or more processors store the determined direction as a direction in which an image is to be captured when a second sound command is recognized, and
wherein, in a case where the second sound command is recognized, the one or more processors perform control such that the rotation unit moves the image capturing direction of the image capturing unit to the stored direction and captures an image.

6. A method for controlling an image capturing apparatus that includes an image capturing unit, and a rotation drive unit, the method comprising:
performing control such that the rotation drive unit moves the image capturing unit,
performing control such that the image capturing unit captures a video or an image,
performing control such that the rotation drive unit moves the image capturing unit to a predetermined direction, and
determining the predetermined direction based on a person captured by the image capturing unit,
wherein the predetermined direction is a direction in which the person's face is oriented that is captured by the image capturing apparatus.

7. A non-transitory recording medium storing a program for causing an image capturing apparatus, which includes an image capturing unit, and a rotation drive unit, to perform a control method, the control method comprising:
performing control such that the rotation drive unit moves the image capturing unit,
performing control such that the image capturing unit captures a video or an image,
performing control such that the rotation drive unit moves the image capturing direction of the image capturing unit to a predetermine direction, and
determining the predetermined direction based on a person captured by the image capturing unit,
wherein the predetermined direction is a direction in which the person's face is oriented that is captured by the image capturing apparatus.

* * * * *